US012170429B2

(12) United States Patent
Endo

(10) Patent No.: US 12,170,429 B2
(45) Date of Patent: Dec. 17, 2024

(54) ROTARY CONNECTOR HAVING AN EXTERNAL CONNECTION TERMINAL MOVABLE IN MULTIPLE DIRECTIONS

(71) Applicant: ALPS ALPINE CO., LTD., Tokyo (JP)

(72) Inventor: Yuki Endo, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 259 days.

(21) Appl. No.: 17/644,407

(22) Filed: Dec. 15, 2021

(65) Prior Publication Data

US 2022/0109276 A1 Apr. 7, 2022

Related U.S. Application Data

(63) Continuation of application No. PCT/JP2020/023474, filed on Jun. 15, 2020.

(30) Foreign Application Priority Data

Jun. 19, 2019 (JP) ................................ 2019-113911

(51) Int. Cl.
*H01R 35/04* (2006.01)
*H01R 12/77* (2011.01)
*H01R 13/506* (2006.01)

(52) U.S. Cl.
CPC ............ *H01R 35/04* (2013.01); *H01R 12/77* (2013.01); *H01R 13/506* (2013.01); *H01R 2201/26* (2013.01)

(58) Field of Classification Search
None
See application file for complete search history.

(56) References Cited

U.S. PATENT DOCUMENTS 5,286,219 A * 2/1994 Ueno .................... H02G 11/00 439/15
5,899,767 A 5/1999 Kato et al.
(Continued)

FOREIGN PATENT DOCUMENTS

| | | |
|---|---|---|
| JP | H09-240488 | 9/1997 |
| JP | H09-260004 | 10/1997 |
| WO | 2019/038992 | 2/2019 |

OTHER PUBLICATIONS

International Search Report for PCT/JP2020/023474 mailed on Aug. 25, 2020.

*Primary Examiner* — Oscar C Jimenez
(74) *Attorney, Agent, or Firm* — IPUSA, PLLC

(57) ABSTRACT

A rotary connector includes a case, a rotor, a flexible cable, an external connection terminal, and a terminal holder. The case includes an outer cylindrical part, the rotor includes an inner cylindrical part, disposed within a housing space of the case, and is rotatably held by the case, the flexible cable is housed in a wound state between the inner cylindrical part and the outer cylindrical part within the housing space, the external connection terminal is provided on an end portion of the flexible cable, and the terminal holder holds the external connection terminal, such that the external connection terminal is movable in a first axis direction and in a second axis direction and is rotatable about a rotation center axis that is parallel to the first axis direction. The first axis direction intersects the second axis direction.

10 Claims, 24 Drawing Sheets

(56) References Cited

U.S. PATENT DOCUMENTS

| | | | | | |
|---|---|---|---|---|---|
| 5,980,285 | A * | 11/1999 | Matsumoto | B60R 16/027 439/736 |
| 5,993,228 | A | 11/1999 | Kubota | |
| 6,042,405 | A * | 3/2000 | Masuda | H01R 35/025 439/15 |
| 6,116,930 | A * | 9/2000 | Sakata | H01R 35/025 439/15 |
| 6,494,727 | B2 * | 12/2002 | Wen-Ching | H01R 35/04 439/131 |
| 9,401,574 | B2 * | 7/2016 | Liao | H01R 31/06 |
| 2004/0209500 | A1 * | 10/2004 | Chang | H01R 35/04 439/131 |
| 2012/0021614 | A1 * | 1/2012 | Chen | H01R 12/716 439/13 |
| 2016/0336704 | A1 * | 11/2016 | Tsushima | H01R 35/00 |
| 2017/0064848 | A1 * | 3/2017 | Premysler | H01R 31/065 |
| 2019/0097372 | A1 * | 3/2019 | Saito | H01R 35/04 |
| 2020/0161819 | A1 * | 5/2020 | Saito | H05K 1/0281 |

* cited by examiner

ROTARY CONNECTOR HAVING AN EXTERNAL CONNECTION TERMINAL MOVABLE IN MULTIPLE DIRECTIONS

CROSS-REFERENCE TO RELATED APPLICATIONS

This application is a continuation of International Application No. PCT/JP2020/023474, filed on Jun. 15, 2020 and designating the U.S., which claims priority to Japanese Patent Application No. 2019-113911, filed on Jun. 19, 2019. The contents of these applications are incorporated herein by reference in their entirety.

BACKGROUND OF THE INVENTION

1. Field of the Invention

The disclosure herein relates to a rotary connector.

2. Description of the Related Art

There are known technologies used in vehicles such as automobiles for electrically connecting various electric components (such as switches and sensors, which are hereinafter referred to as "steering-side electric components") provided in a steering wheel to various electric components (such as an electronic control unit (ECU), which are hereafter referred to as "vehicle-side electric components") provided in a vehicle body by using a rotary connector provided between the steering wheel and the vehicle body.

For example, a rotary connector includes a case that is fixedly attached to a vehicle body, a rotor that is rotatable relative to the case and to which a steering wheel is attached, and a flexible cable (for example, a flexible printed circuit (FPC) or a flat cable) that is provided in a wound state within a housing space of the case and electrically connects steering-side electric components to vehicle-side electric components. With this configuration of the rotary connector, when a rotating operation of the steering wheel is performed and the rotor rotates together with the steering wheel, the flexible cable is wound and unwound, and the electric connection via the flexible cable between the steering-side electric components and the vehicle-side electric components is maintained.

In such a rotary connector, an external connection terminal is provided at the end portion of a flexible cable and fixed to a case. The flexible cable can be electrically connected to a connection partner (such as a connector on the vehicle body side) by connecting the external connection terminal to the connection partner at the same time when the case is attached to the vehicle body.

Further, Patent Document 1 discloses a technology with respect to a rotary connector that includes a first block and a second block. The first block connects a lead block for holding an external terminal to a main flat cable, the second block fixes the external terminal, and the first block is rotatable relative to the second block.

However, with the technology disclosed in Patent Document 1, when a case is attached to a vehicle body, it is difficult to accurately position the external connection terminal with respect to a connection partner (such as a connector on the vehicle body side). In particular, when a manufacturing error occurs in the external connection terminal or the connection partner, it becomes more difficult to accurately position the external connection terminal as the manufacturing error increases.

RELATED-ART DOCUMENTS

Patent Documents

Patent Document 1: WO2019/038992

SUMMARY OF THE INVENTION

According to at least one embodiment, a rotary connector includes a case, a rotor, a flexible cable, an external connection terminal, and a terminal holder. The case includes an outer cylindrical part, the rotor includes an inner cylindrical part, disposed within a housing space of the case, and is rotatably held by the case, the flexible cable is housed in a wound state between the inner cylindrical part and the outer cylindrical part within the housing space, the external connection terminal is provided on an end portion of the flexible cable, and the terminal holder holds the external connection terminal, such that the external connection terminal is movable in a first axis direction and in a second axis direction and is rotatable about a rotation center axis that is parallel to the first axis direction. The first axis direction intersects the second axis direction.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

Figure 1:
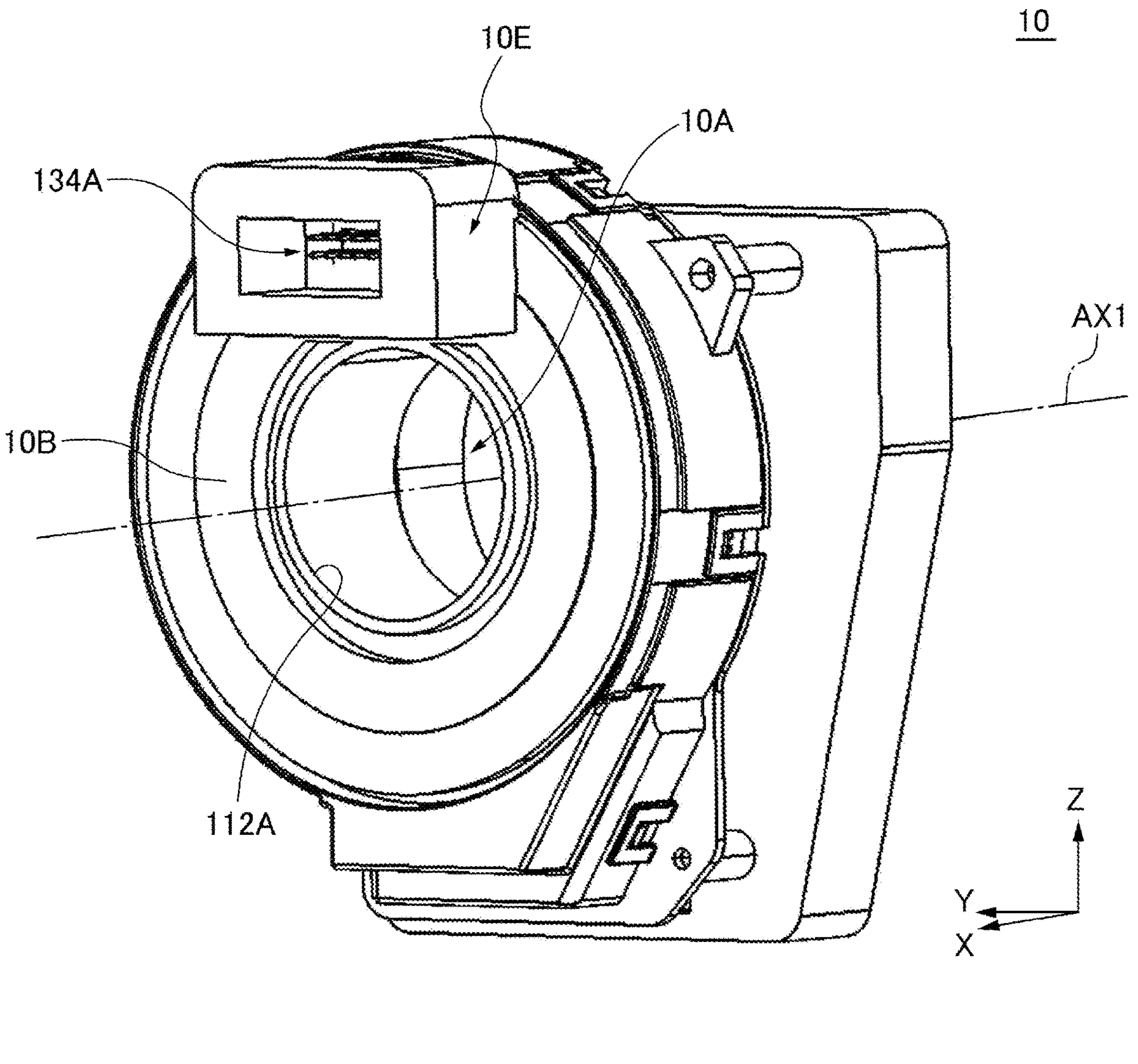
FIG. 1 is a perspective view of a rotary connector (on a steering wheel side) according to an embodiment.

According to an embodiment of the present invention, an external connection terminal included in a rotary connector can be readily positioned with respect to a connection partner.

In the following, embodiments of the present invention will be described with reference to the accompanying drawings. In the following description, the +Z axis side in the drawings is referred to as an upper side, and the −Z axis side in the drawings is referred to as a lower side for the sake of convenience. Further, the +X axis side in the drawings is referred to as a rear side (a steering wheel 12 side), and the −X axis side in the drawings is referred to as a front side (a vehicle body 14 side). Further, the +Y axis side in the drawings is referred to as a left side, and the −Y axis side in the drawings is referred to as a right side. Further, the Y axis direction is an example of a "first axis direction", and the Z axis direction is an example of a "second axis direction".

(Outline of Rotary Connector 10)

Figure 2:
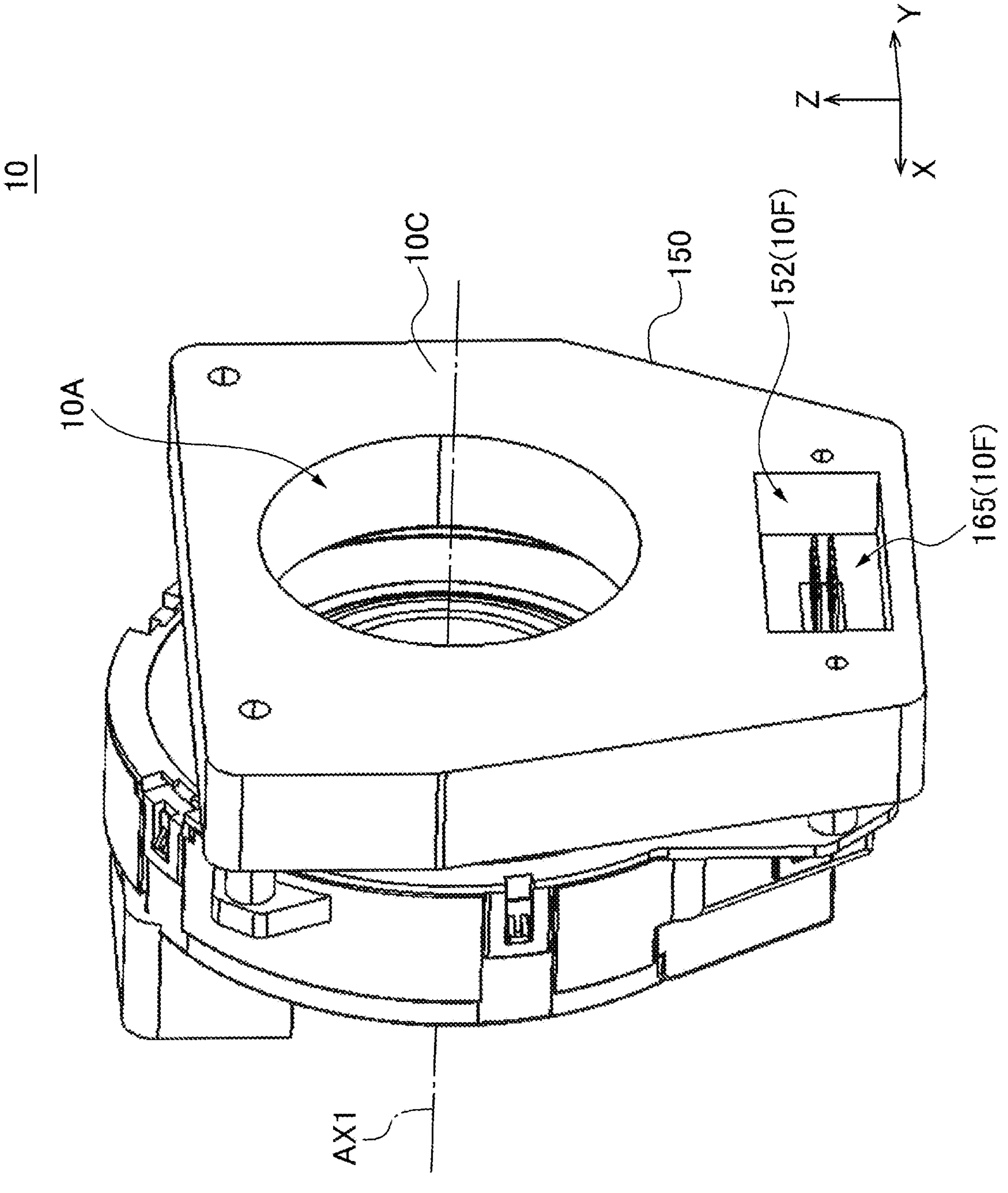
FIG. 2 is a perspective view of the rotary connector (on a vehicle body side) according to the embodiment.

FIG. 1 is a perspective view of a rotary connector 10 (on the steering wheel 12 side) according to an embodiment. FIG. 2 is a perspective view of the rotary connector 10 (on the vehicle body 14 side) according to the embodiment.

Figure 3A:
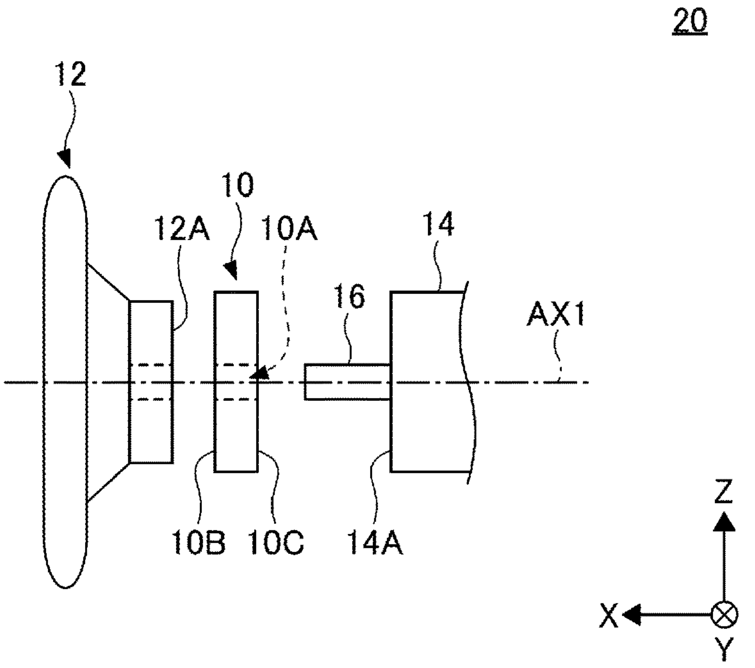
FIG. 3A is a drawing illustrating a method of assembling a steering device according to the embodiment.
Figure 3B:
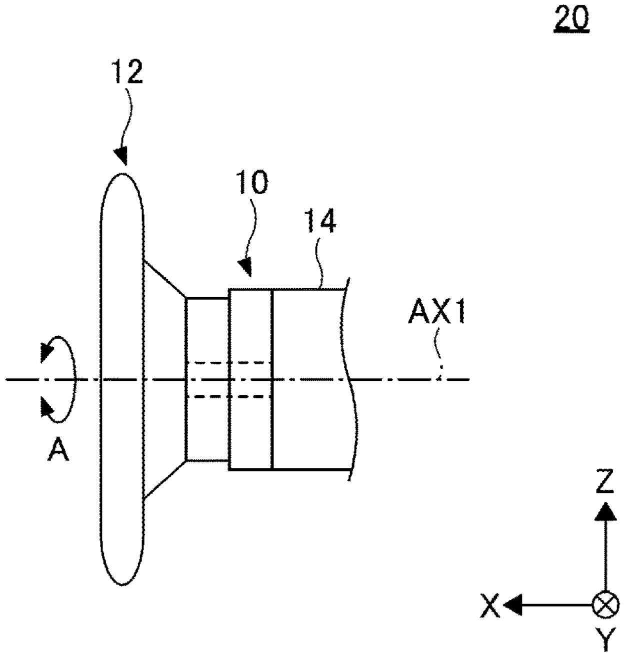
FIG. 3B is a drawing illustrating a method of assembling the steering device according to the embodiment.

The rotary connector 10 illustrated in FIG. 1 and FIG. 2 is incorporated in a steering device 20 (see FIG. 3A and FIG. 3B) of a vehicle such as an automobile and electrically connects various steering-side electric components (such as paddle switches, operation switches, airbags, detection sensors, vibration generators, and heaters) provided in the steering wheel 12 (see FIG. 3A and FIG. 3B) to various vehicle-side electric components (such as an ECU) provided in the vehicle body 14 (see FIG. 3A and FIG. 3B).

As illustrated in FIGS. 1 and 2, the entire rotary connector 10 has a substantially thin cylinder shape. A cylindrical through hole 10A extending along a rotation center axis AX1 is formed at the center of the rotary connector 10. A steering shaft 16 (see FIG. 3A) is inserted into the through hole 10A.

The rotary connector 10 has a connection surface 10B and a connection surface 10C. The connection surface 10B is a connection surface on the steering wheel 12 side (the +X axis side in the drawings). The connection surface 10B is a flat surface having a substantially circular shape, and the through hole 10A is formed in the center portion of the connection surface 10B. A connector 10E provided on the connection surface 10B protrudes toward the steering wheel 12 side (the +X axis side in the drawings). An opening 116A (see FIG. 4) is provided in the inner surface of a protruding portion of a connector case 116, which constitutes the connector 10E, and an external connection terminal 134A passes through the opening 116A. The connector 10E holds a connector provided on the steering wheel 12 by the inner wall of the protruding portion of the connector case 116 and connects to the external connection terminal 134A.

The connection surface 10C is a connection surface on the vehicle body 14 side (the −X axis side in the drawings) of a housing 150, and is fixed to the vehicle body 14 via a fixing part (not illustrated). The connection surface 10C is substantially circular in shape, and the through hole 10A is formed in the center portion of the connection surface 10C. A connector 10F is provided on the connection surface 10C so as to be recessed toward the steering wheel 12 side (the +X axis side in the drawings). A recess 152 is formed in the housing 150, and the external connection terminal 165 passes through the inner surface of the recess 152 so as to protrude within the recess 152. The connector 10F holds a connector provided on the vehicle body 14 by the inner wall of the recess 152, and is connected to the external connection terminal 165.

The connector 10E provided on the connection surface 10B and the connector 10F provided on the connection surface 10C are electrically connected to each other by a flexible printed circuit (FPC) unit 130 (see FIG. 4) provided in the rotary connector 10. In the following, the flexible printed circuit (FPC) is simply referred to as a "FPC".

(Method of Assembling Steering Device 20)

FIG. 3A and FIG. 3B are drawings illustrating a method of assembling the steering device 20 according to the embodiment. As illustrated in FIG. 3A and FIG. 3B, the steering device 20 includes the rotary connector 10, the steering wheel 12, the vehicle body 14, and the steering shaft 16. The steering shaft 16 is a round rod-shaped component that extends from the vehicle body 14 along the rotation center axis AX1 toward the steering wheel 12 in the +X axis direction.

In the steering device 20, the steering shaft 16 is inserted into the through hole 10A of the rotary connector 10 in the direction of the rotation center axis AX1. The rotary connector 10 is fixedly attached to the vehicle body 14 such that the connection surface 10C is joined to a connection surface 14A of the vehicle body 14. In this state, the connector 10F provided on the connection surface 10C is connected to a connector (not illustrated) provided on the vehicle body 14. Accordingly, the rotary connector 10 is electrically connected to a vehicle-side electric component.

Further, the steering wheel 12 is fixedly attached to the rotary connector 10 such that the connection surface 10B is joined to a connection surface 12A of the steering wheel 12. In this state, the connector 10E provided on the connection surface 10B is connected to a connector (not illustrated) provided on the steering wheel 12. Accordingly, the rotary connector 10 is electrically connected to a steering-side electric component.

The rotary connector 10 is configured such that the connection surface 10B is rotatable about the rotation center axis AX1 (in the direction of an arrow A in the drawing) with respect to the connection surface 10C of the housing 150. With this configuration, when the steering wheel 12 is rotated in a state where the rotary connector 10 is incorporated in the steering device 20, the connection surface 10B to which the steering wheel 12 is attached can be rotated together with the steering wheel 12 while the connection surface 10C is fixed to the vehicle body 14. Accordingly, the rotary connector 10 can electrically connect steering-side electric components to vehicle-side electric components without preventing the rotating operation of the steering wheel 12.

(Configuration of Rotary Connector 10)

Figure 4:
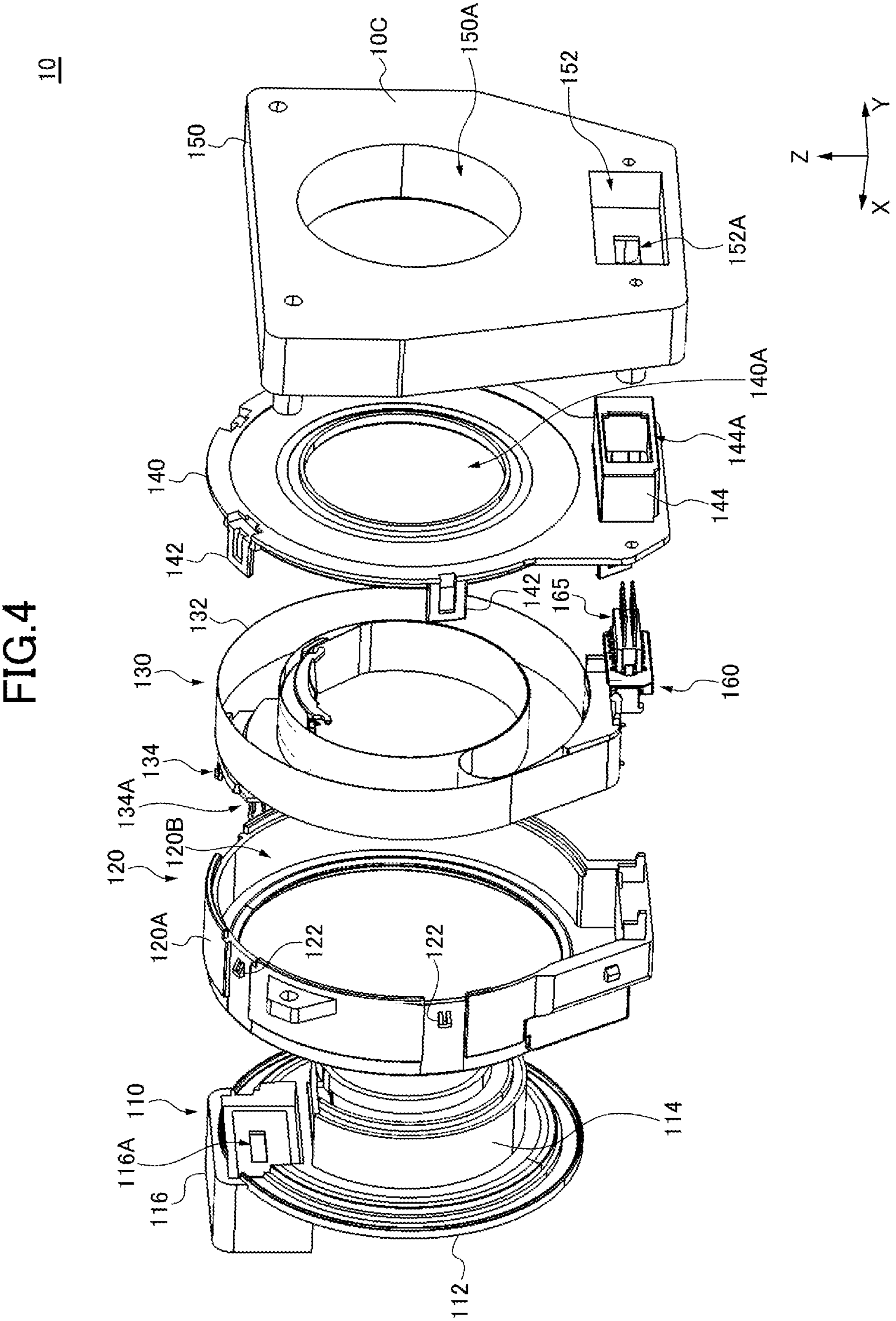
FIG. 4 is an exploded perspective view of the rotary connector according to the embodiment.

FIG. 4 is an exploded perspective view of the rotary connector 10 according to the embodiment. As illustrated in FIG. 4, the rotary connector 10 includes a rotor 110, a case body 120, the FPC unit 130, a case cover 140, and the housing 150 in order from the steering wheel 12 side (the +X axis side in the drawing).

The rotor 110 is a component to which the steering wheel 12 is attached and rotates together with the steering wheel 12. The rotor 110 includes a flat plate part 112 and an inner cylindrical part 114. The flat plate part 112 is a disc-shaped part that extends in a direction orthogonal to the rotation center axis AX1. The surface of the flat plate part 112 serves as the connection surface 10B of the rotary connector 10. The connector case 116, which constitutes the connector 10E, is provided on the surface of the flat plate part 112, which serves as the connection surface 10B, so as to protrude toward the steering wheel 12 side. The opening 116A is formed in the inner surface of the connector case 116. The external connection terminal 134A included in a terminal 134 of the FPC unit 130 is fitted into the opening 116A from the vehicle body 14 side (the −X axis side in the drawing). Accordingly, the external connection terminal 134A included in the terminal 134 is positioned with respect to the opening 116A. A group of metal terminals included in the external connection terminal 134A is positioned in the connector case 116 while protruding from the inner surface of the connector case 116. As illustrated in FIG. 1, a circular opening 112A of the through hole 10A is formed at the center of the case cover 144. The inner cylindrical part 114 is a cylindrical part provided on the periphery of the opening 112A of the flat plate part 112 so as to protrude toward the vehicle body 14 side (the −X axis side in the drawing). The steering shaft 16 is inserted into the inner cylindrical part 114. Therefore, the inner cylindrical part 114 functions as a rotation shaft of the rotor 110. The opening on the steering wheel 12 side (the +X axis side in the drawing) of the case body 120 is closed by the flat plate part 112, and the rotor 110 is rotatably attached to the case body 120.

The case body 120 is an example of a "case". The case body 120 is a component that is fixed to the housing 150 and includes an outer cylindrical part 120A having a substantially cylindrical shape. The case body 120 has a housing space 120B having an annular shape and provided between the inner cylindrical part 114 of the rotor 110 and the outer cylindrical part 120A. The FPC unit 130 is housed within the housing space 120B. The case body 120 has an annular-shaped opening extending in a plane perpendicular to the X axis and located on the steering wheel 12 side (the +X axis side in the drawing) of the housing space 120B of the case body 120. The opening is closed by the annular-shaped flat plate part 112 of the rotor 110 that is rotatably attached to the case body 120 with the X axis being the center of rotation. In practice, although not illustrated, multiple rollers for guiding the winding operation and the unwinding operation of an FPC 132 in association with the rotating operation of the steering wheel 12, and a roller holder for rotatably holding the multiple rollers are provided within the housing space 120B of the case body 120 in addition to the FPC unit 130.

The FPC unit 130 includes the FPC 132, the terminal 134, and a terminal 160. The FPC 132 is an example of a "flexible cable". The FPC 132 is a flexible strip-shaped wiring component that is formed by covering surfaces of a strip-shaped conductor wire (for example, copper foil) with a flexible and insulating material (for example, polyimide resin or polyethylene terephthalate (PET)). The FPC 132 is provided in a wound state within the housing space 120B of the case body 120, and electrically connects the terminal 134 to the terminal 160. The terminal 134 is provided at one end of the FPC 132, and is electrically connected to a steering-side electric component via the external connection terminal 134A. The terminal 160 is provided at the other end of the FPC 132, and is electrically connected to a vehicle-side electric component via the external connection terminal 165.

The case cover 140 is a lid-like component that has a substantially annular shape and closes the annular-shaped opening extending in a plane perpendicular to the X axis and provided on the vehicle body 14 side (the −X axis side in the drawing) of the housing space 120B of the case body 120. A plurality of claw-shaped hooks 142 are provided on the periphery of the case cover 140. The plurality of hooks 142 are fitted into respective engaging claws 122 formed on the outer wall of the case body 120. As a result, the case cover 140 is fixedly joined to the case body 120. A circular opening 140A is formed at the center of the case cover 140, with the rotation center axis (X axis) of the rotor 110 being the center. The steering shaft 16 is inserted into the opening 140A. A connector case 144 having a substantially rectangular shape is provided on the surface on the vehicle body 14 side (the −X axis side in the drawing) of the case cover 140 so as to protrude toward the vehicle body 14 side (the −X axis side in the drawing). The connector case 144 has an opening on the steering wheel 12 side (the +X axis side in the drawing) of the connector case 144. Further, the connector case 144 has a rectangular-shaped opening 144A on the vehicle body 14 side (the −X axis side in the drawing) of the connector case 144. The terminal 160 of the FPC unit 130 is inserted into the connector case 144 through the opening on the steering wheel 12 side (the +X axis side in the drawing) of the connector case 144. In this state, the external connection terminal 165 included in the terminal 160 passes through the opening 144A and protrudes from the surface on the vehicle body 14 side (the −X axis side in the drawing) of the connector case 144 toward the vehicle body 14 side (the −X axis side in the drawing).

The housing 150 is a member having any shape according to the type of the vehicle body 14 to which the rotary connector 10 is attached. The rotor 110, the FPC unit 130, and the case cover 140 are assembled into the case body 120, and in this state, the case body 120 is fixed to the steering wheel 12 side (the +X axis side in the drawing) of the housing 150. The surface on the vehicle body 14 side (the −X axis side in the drawing) of the housing 150 serves as the connection surface 10C of the rotary connector 10, and is joined to the connection surface 14A of the vehicle body 14 (see FIG. 3A). A circular opening 150A is formed in the housing 150. The steering shaft 16 is inserted into the opening 150A. The recess 152, which constitutes the connector 10F, is formed in the surface on the vehicle body 14 side (the −X axis side in the drawing) of the housing 150. An opening 152A having a rectangular shape is formed in the inner surface of the recess 152. A terminal block 165A (see FIG. 7 through FIG. 9) of the external connection terminal 165 included in the terminal 160 of the FPC unit 130 is fitted into the opening 152A from the steering wheel 12 side (the +X axis side in the drawing). Accordingly, the external connection terminal 165 is positioned with respect to the opening 152A. In this state, a group of metal terminals 165B (see FIG. 7 through FIG. 9) included in the external connection terminal 165 is positioned in the recess 152, and protrudes from the inner surface of the recess 152.

(Operation of External Connection Terminal 165)

Figure 5:
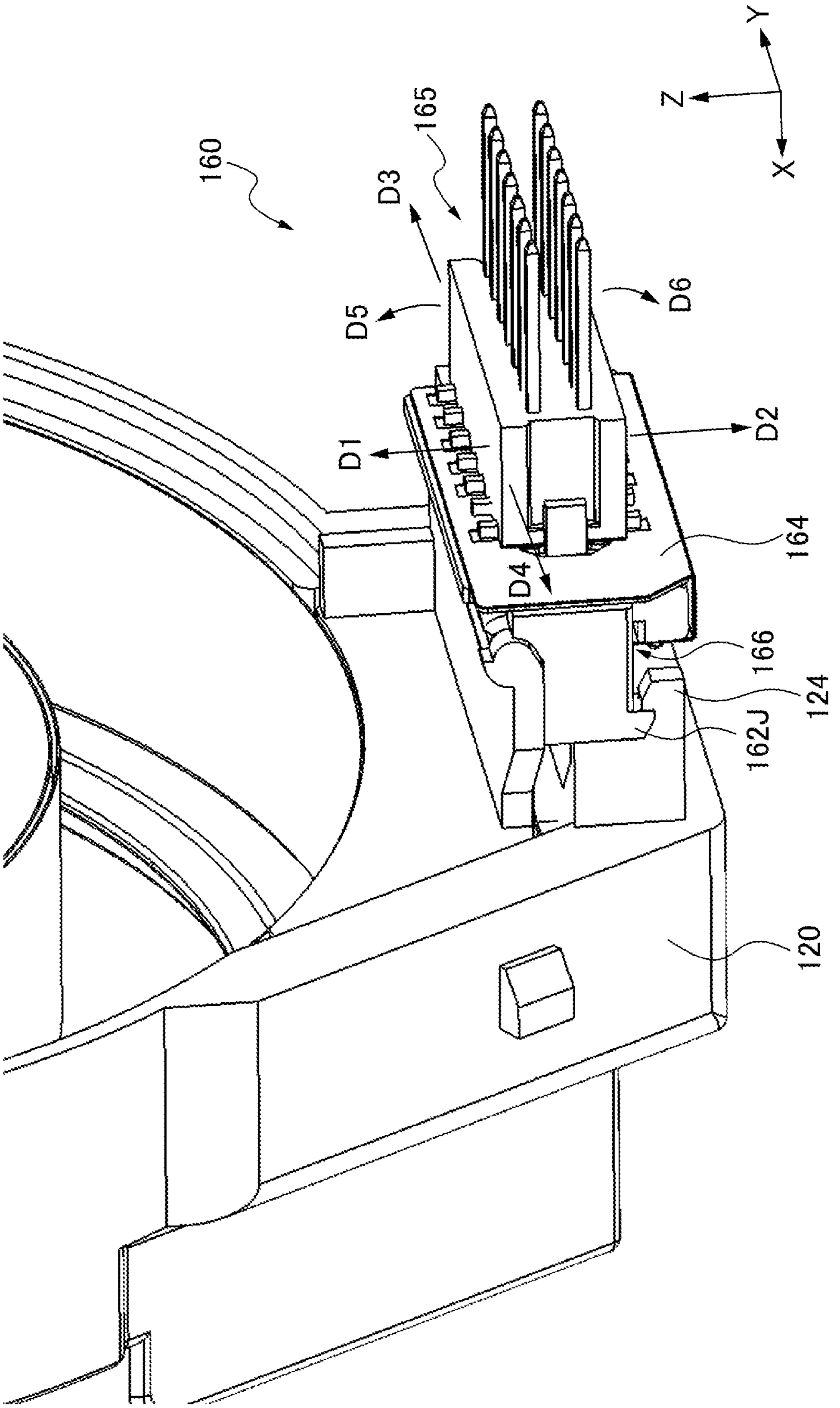
FIG. 5 is a diagram illustrating the operation of an external connection terminal included in an FPC unit according to the embodiment.
Figure 6:
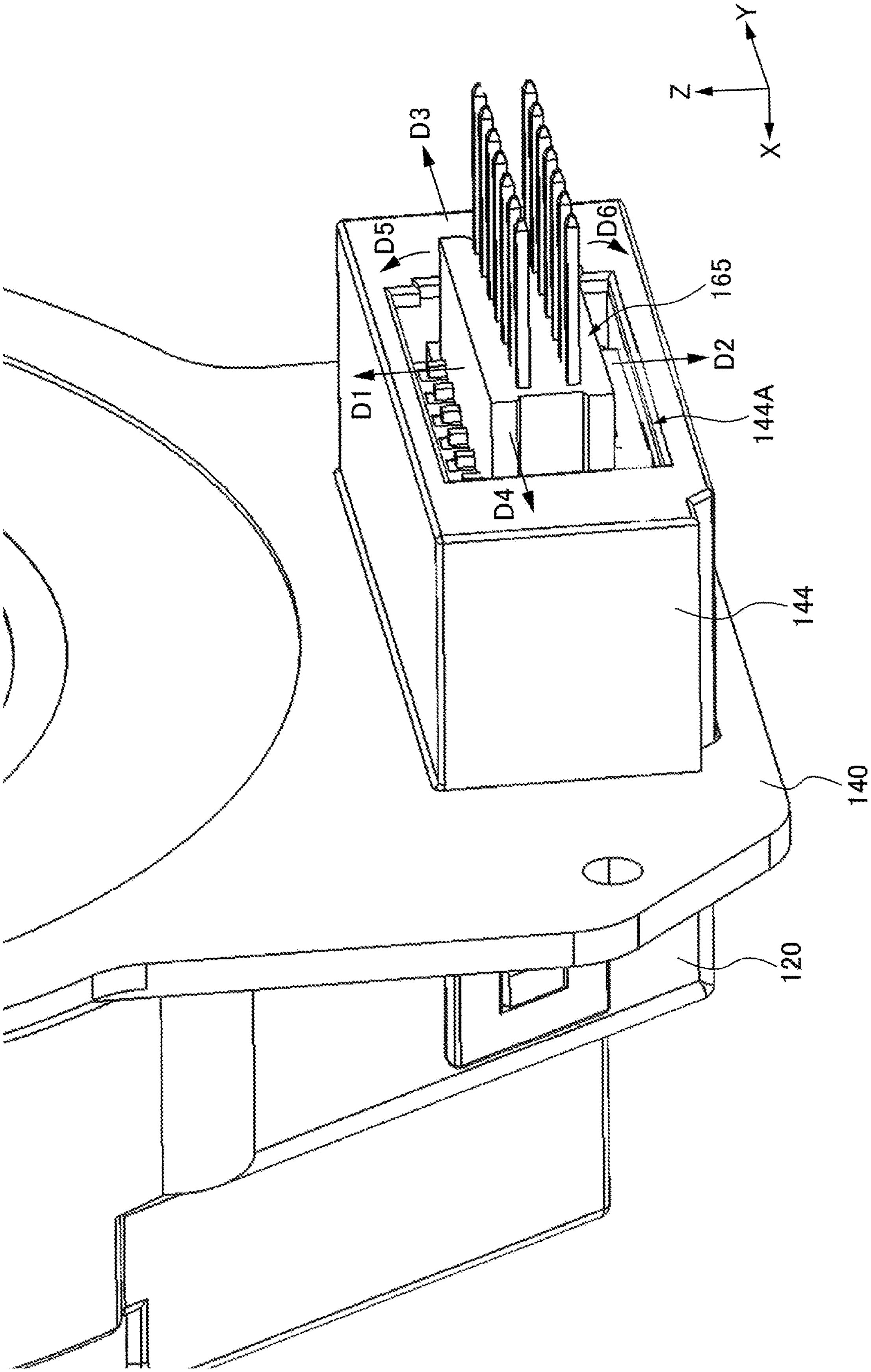
FIG. 6 is a diagram illustrating the operation of the external connection terminal included in the FPC unit according to the embodiment.

FIG. 5 and FIG. 6 are diagrams illustrating the operation of the external connection terminal 165 included in the FPC unit 130 according to the embodiment. FIG. 5 depicts a state in which the FPC unit 130 is housed in the case body 120. FIG. 6 depicts a state in which the FPC unit 130 is housed in the case body 120 and the case cover 140 is attached to the case body 120.

As illustrated in FIG. 5, the entirety of the terminal 160 of the FPC unit 130 extends from the bottom portion of the case body 120 toward the vehicle body 14 side (the −X axis side in the drawing). The terminal 160 includes the external connection terminal 165, a relay FPC 164, and a terminal holder 166 in order from the vehicle body 14 side (the −X axis side in the drawing).

In the terminal 160, a bottom portion (a portion on the +X axis side) of the external connection terminal 165 is held by the terminal holder 166, and the external connection terminal 165 is movable in the +Z axis direction (D1 direction in the drawings), in the −Z axis direction (D2 direction in the drawings), in the +Y axis direction (D3 direction in the drawings), and in the −Y axis direction (D4 direction in the drawings). Further, when viewed from the −Y axis side, the external connection terminal 165 is rotatable counterclockwise (in the D5 direction in the drawings) and clockwise (in the D6 direction in the drawings) with the Y axis being the center of rotation. The movable and rotatable structure of the external connection terminal 165 will be described later in detail.

As illustrated in FIG. 6, the external connection terminal 165 is movable in the Z axis direction and in the Y axis direction within the opening 144A in a state in which the external connection terminal 165 is disposed so as to protrude from the opening 144A of the connector case 144 toward the vehicle body 14 side (the −X axis side in the drawing). In addition, when viewed from the −Y axis side, the external connection terminal 165 is rotatable counterclockwise and clockwise with the Y axis being the center of rotation.

Accordingly, in the rotary connector 10 according to the present embodiment, the position and orientation of the external connection terminal 165 can be flexibly changed when the case body 120 is attached to the housing 150. Therefore, the external connection terminal 165 can be readily positioned in the opening 152A, provided at a reference position of the recess 152 of the housing 150, and can be fitted into and held in the opening 152A. Accordingly, in the rotary connector 10 according to the present embodiment, even if there are accumulated dimensional tolerances of related parts or a manufacturing error occurs in, for example, the position of the opening 152A when the case body 120 is attached to the housing 150, the accumulated tolerances or the manufacturing error can be absorbed by flexibly changing the position of the external connection terminal 165 or rotating the external connection terminal 165 so as to change the orientation of the external connection terminal 165. Therefore, the external connection terminal 165 can be readily positioned at the reference position of the recess 152 of the housing 150, and can be fitted into and held in the opening 152A.

(Configuration of Components of Terminal 160)

Figure 7:
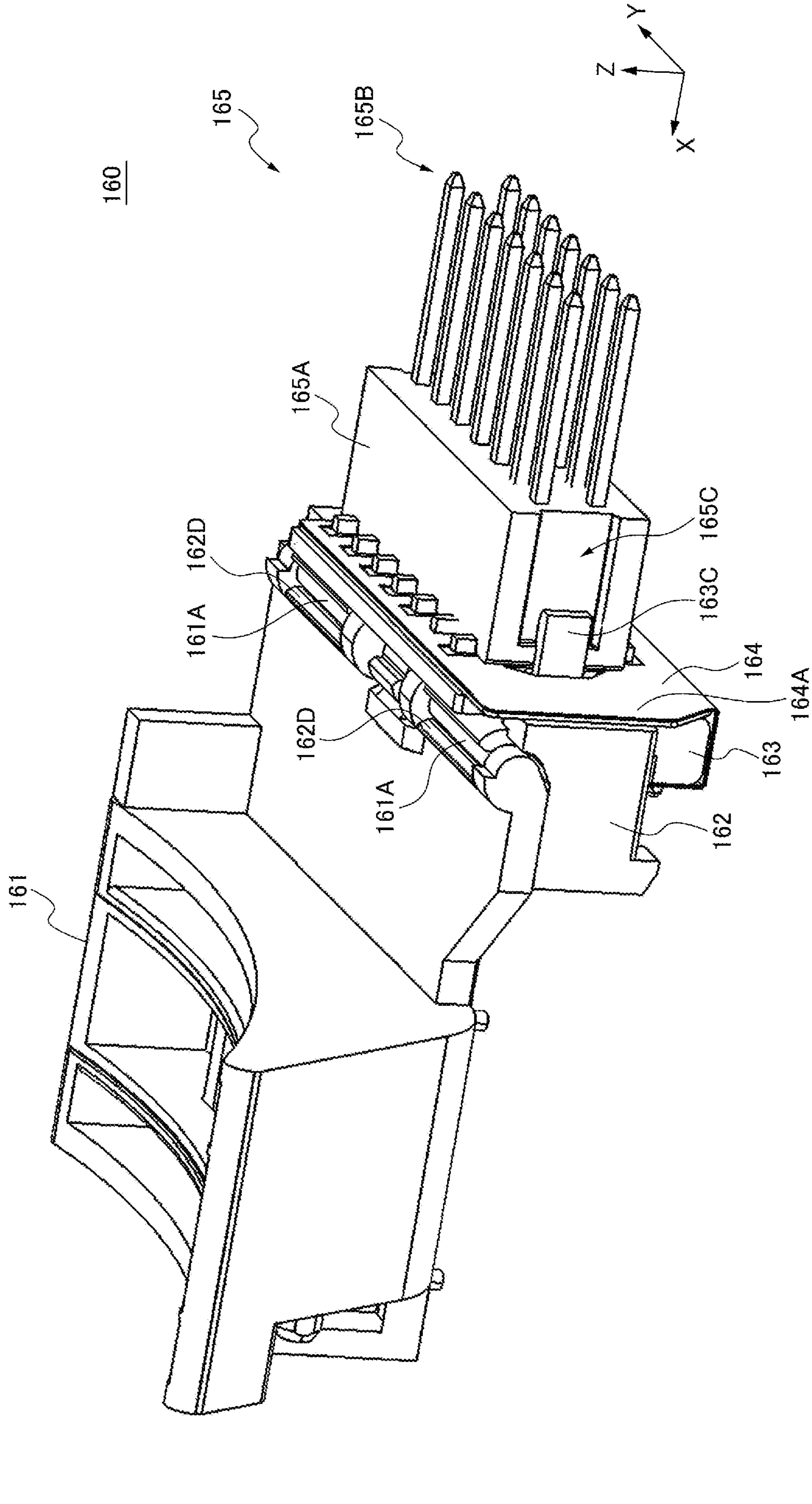
FIG. 7 is a perspective view of the exterior of a terminal when viewed from above and front according to the embodiment.
Figure 8:
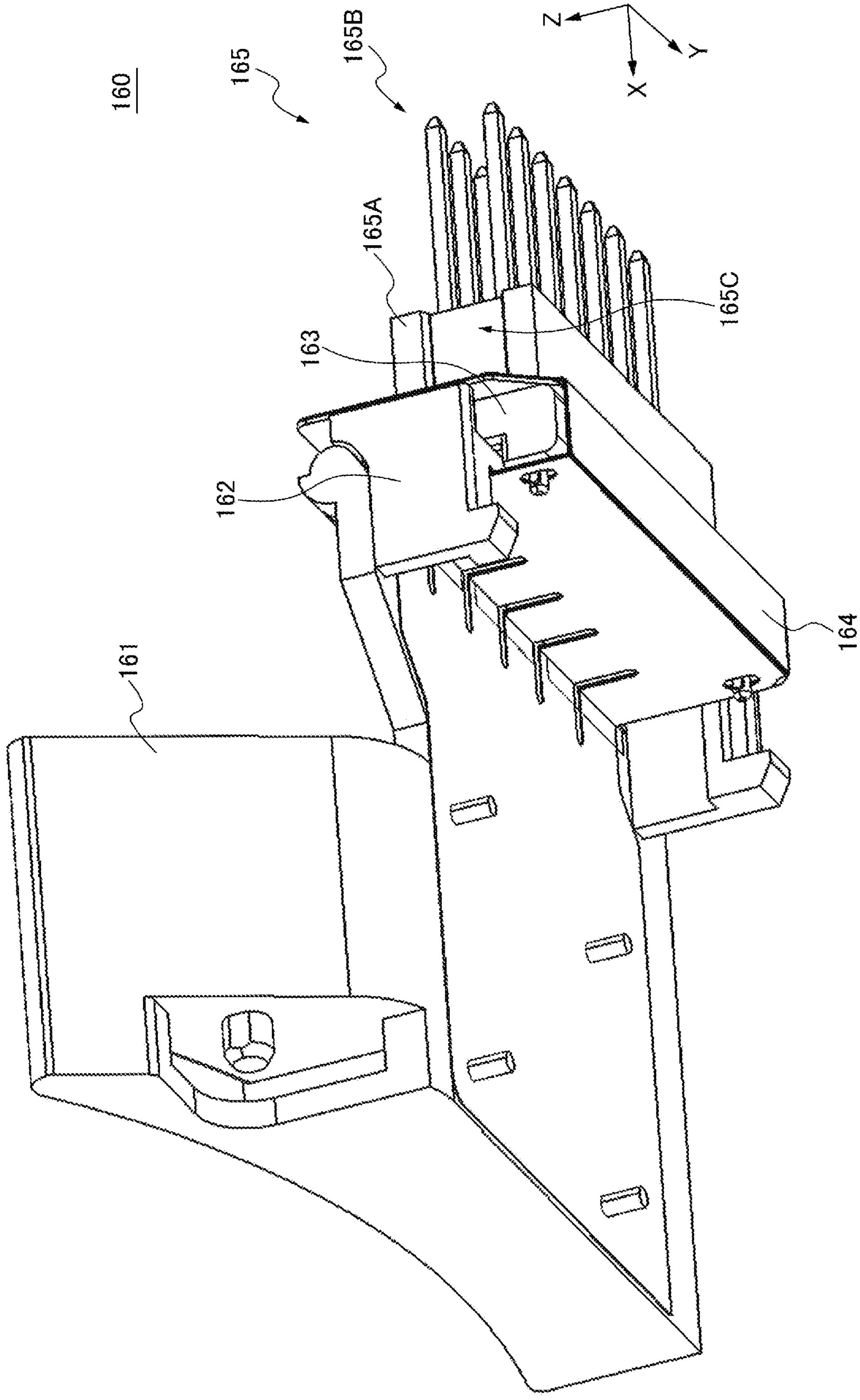
FIG. 8 is a perspective view of the exterior of the terminal when viewed from below and rear according to the embodiment.
Figure 9:
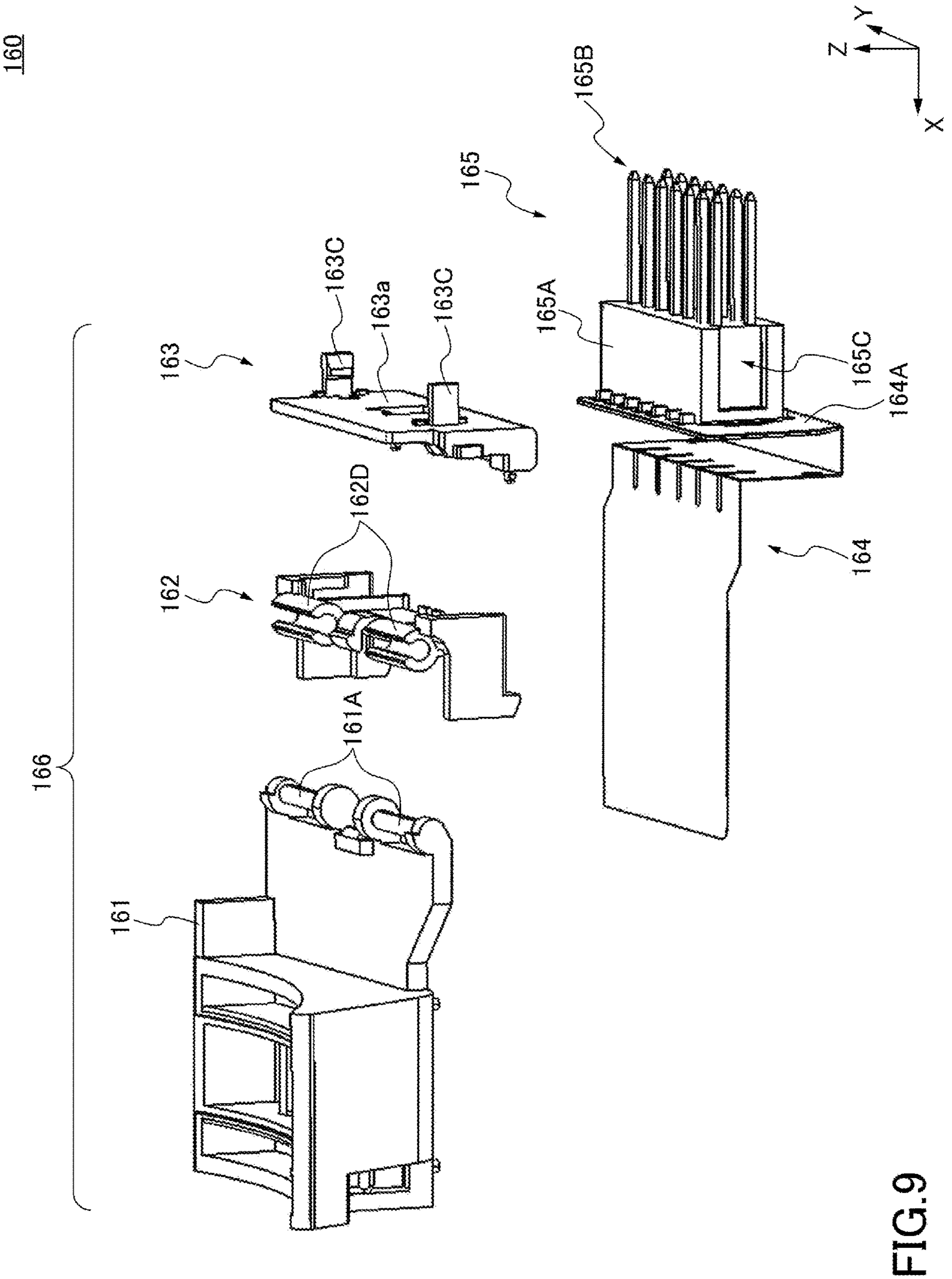
FIG. 9 is an exploded perspective view of the terminal according to the embodiment.

Next, a configuration of components of the terminal 160 will be described with reference to FIG. 7 through FIG. 9. FIG. 7 is a perspective view of the exterior of the terminal 160 when viewed from the above (+Z axis side) and the front (−X axis side) according to the embodiment. FIG. 8 is a perspective view of the exterior of the terminal 160 when viewed from the below (−Z axis side) and the rear (+X axis side) according to the embodiment. FIG. 9 is an exploded perspective view of the terminal 160 according to the embodiment.

As illustrated in FIG. 7 through FIG. 9, the terminal 160 includes a first holder 161, a second holder 162, a third holder 163, the relay FPC 164, and the external connection terminal 165.

The first holder 161 is an example of a "first holding member". The first holder 161 is made of a resin and fixed to the case body 120. The first holder 161 includes a pair of shafts 161A extending coaxially in the left-right direction (the Y axis direction). The shafts 161A are provided at the end portions on the front side (the −X axis side) of the first holder 161.

The second holder 162 is an example of a "second holding member". The second holder 162 is made of a resin, and includes a pair of holding arms 162D extending coaxially in the left-right direction (the Y axis direction). The holding arms 162D are provided at the upper end portions of the second holder 162. The shafts 161A of the first holder 161 are fitted into the respective holding arms 162D, such that the second holder 162 is held by the first holder 161 so as to be movable in the Y axis direction and in rotatable about a rotation center axis AX2 (see FIG. 10) that passes through the center of the shaft 161A.

The third holder 163 is an example of a "third holding member". The third holder 163 is made of a resin and is held by the second holder 162 so as to be movable in the Z axis direction. The third holder 163 has an installation surface 163*a* on the front side (the −X axis side). A pair of engaging claws 163 is provided on the installation surface 163*a*, and the engaging claws 163 face each other in the Y axis direction.

The relay FPC 164 is an example of a "relay flexible cable", and is a flexible film-shaped wiring component that is formed by covering surfaces of a strip-shaped conductor wire (for example, copper foil) with a flexible and insulating material (for example, polyimide resin or polyethylene terephthalate (PET)). One end of the relay FPC 164 is connected to the end portion of the FPC 132, and the other end of the relay FPC 164 is connected to the external connection terminal 165. The relay FPC 164 has a bent shape conforming to the surface of the terminal holder 166 (the surfaces of the first holder 161, the second holder 162, and the third holder 163) on which the relay FPC 164 is disposed.

The external connection terminal 165 includes the terminal block 165A and the group of metal terminals 165B. One end of the group of metal terminals 165B protrudes from the surface on the front side (the −X axis side) of the terminal block 165A, and the other end of the group of metal terminals 165B is bent in the Z axis direction from the surface on the rear side (the +X axis side) of the terminal block 165A. The other end of the group of metal terminals 165B is electrically connected to wiring (not illustrated) of the relay FPC 164. The terminal block 165A is a member that is made of a resin. The terminal block 165A holds middle portions of the metal terminals 165B in an aligned state (that is, the terminal block 165A holds the metal terminals 165B that are aligned). The terminal block 165A, together with the group of metal terminals 165B, is connected to the wiring of a first flat surface portion 164A of the relay FPC 164 by reflow soldering. The terminal block 165A, together with the first flat surface portion 164A of the relay FPC 164, is placed on the installation surface 163*a* of the third holder 163. The engaging claws 163C projecting from the installation surface 163*a* are fitted into engaging grooves 165C formed in the left and right side surfaces of the terminal block 165A. In this manner, the terminal block 165A and the first flat surface portion 164A of the relay FPC 164, which are connected to each other, are held by the third holder 163.

(Coupling Configuration of First Holder 161 and Second Holder 162)

Figure 10:
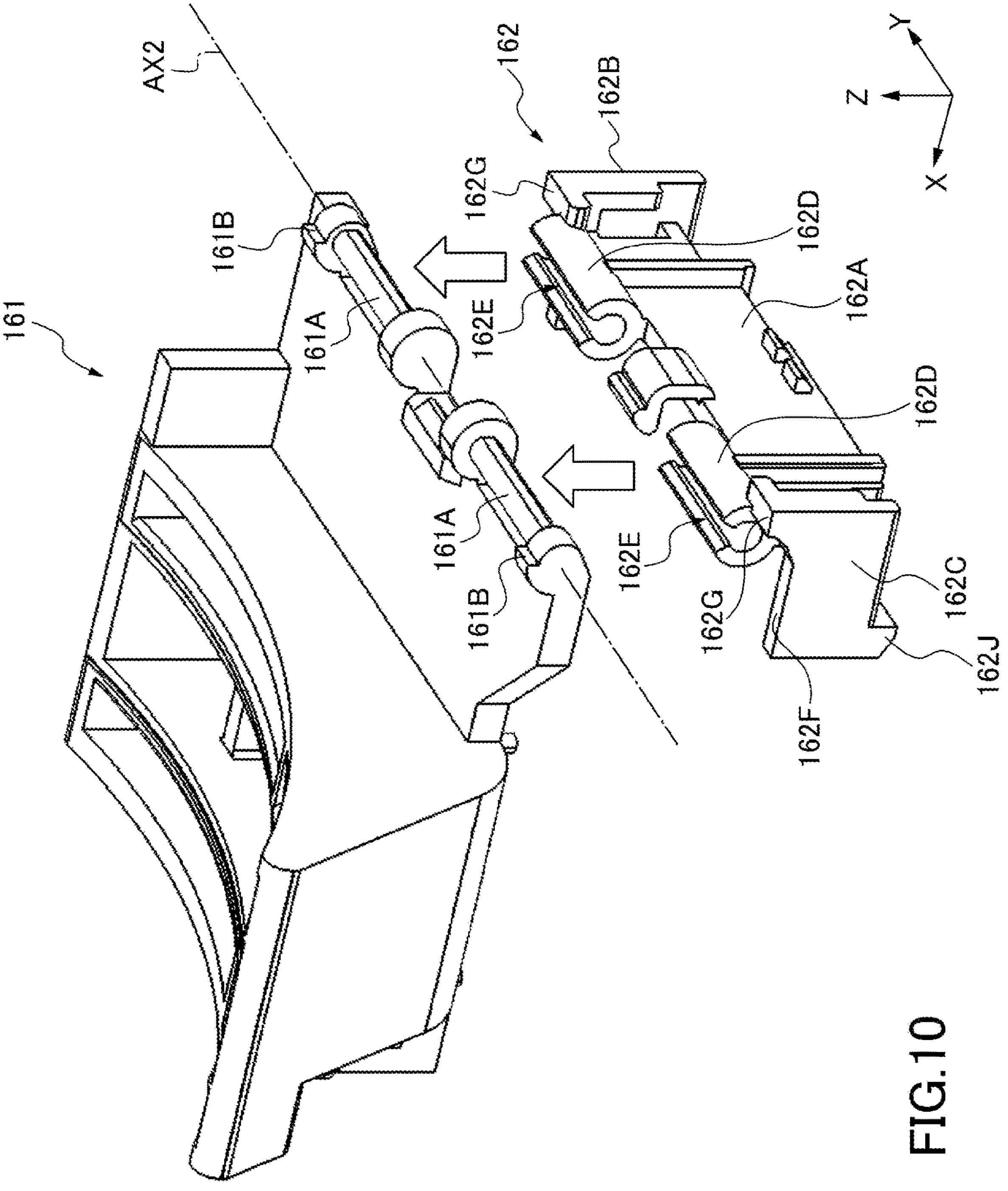
FIG. 10 is a perspective view illustrating a state in which a first holder and a second holder are not coupled to each other.
Figure 11:
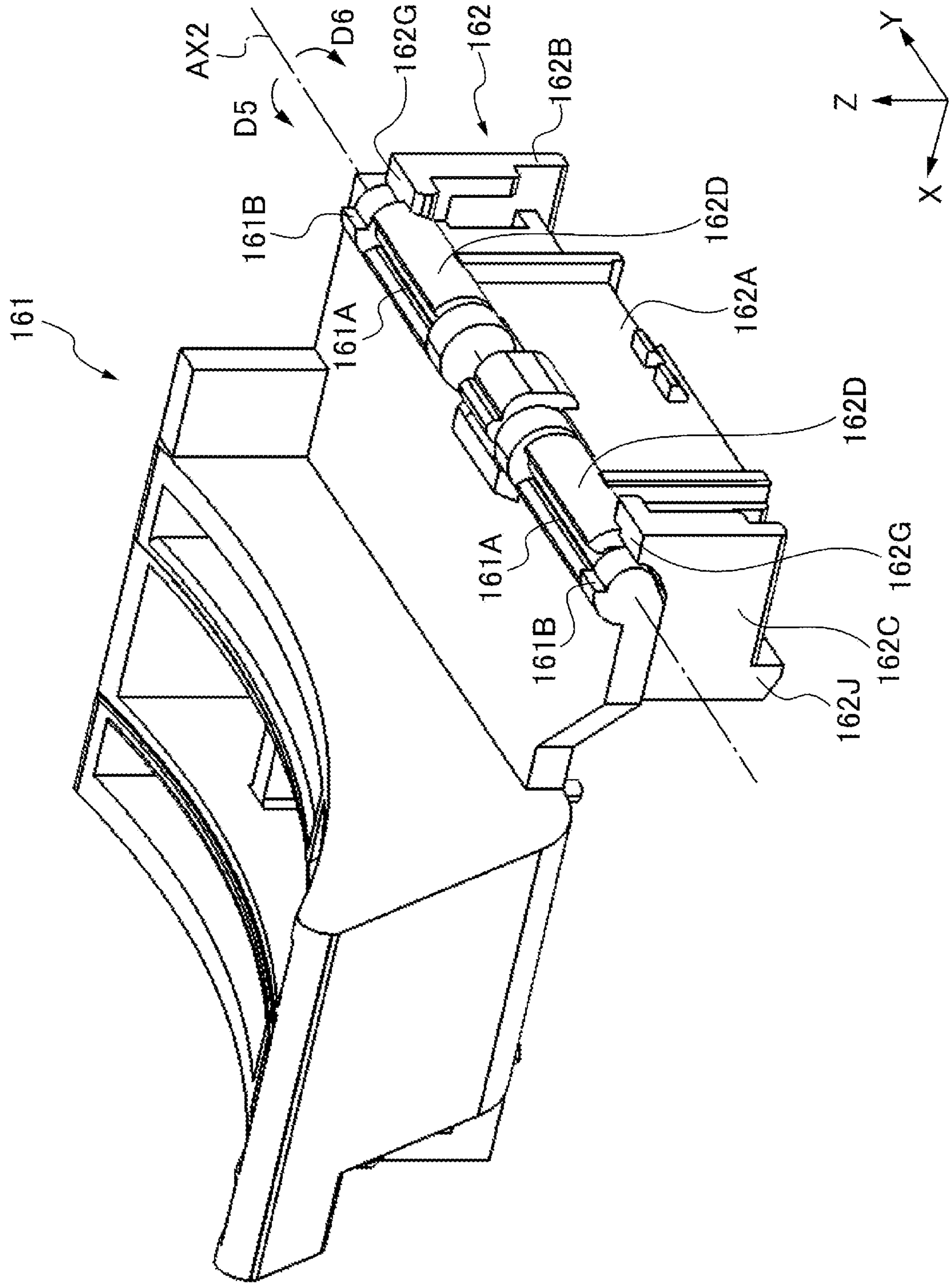
FIG. 11 is a perspective view illustrating a state in which the first holder and the second holder are coupled to each other.
Figure 12:
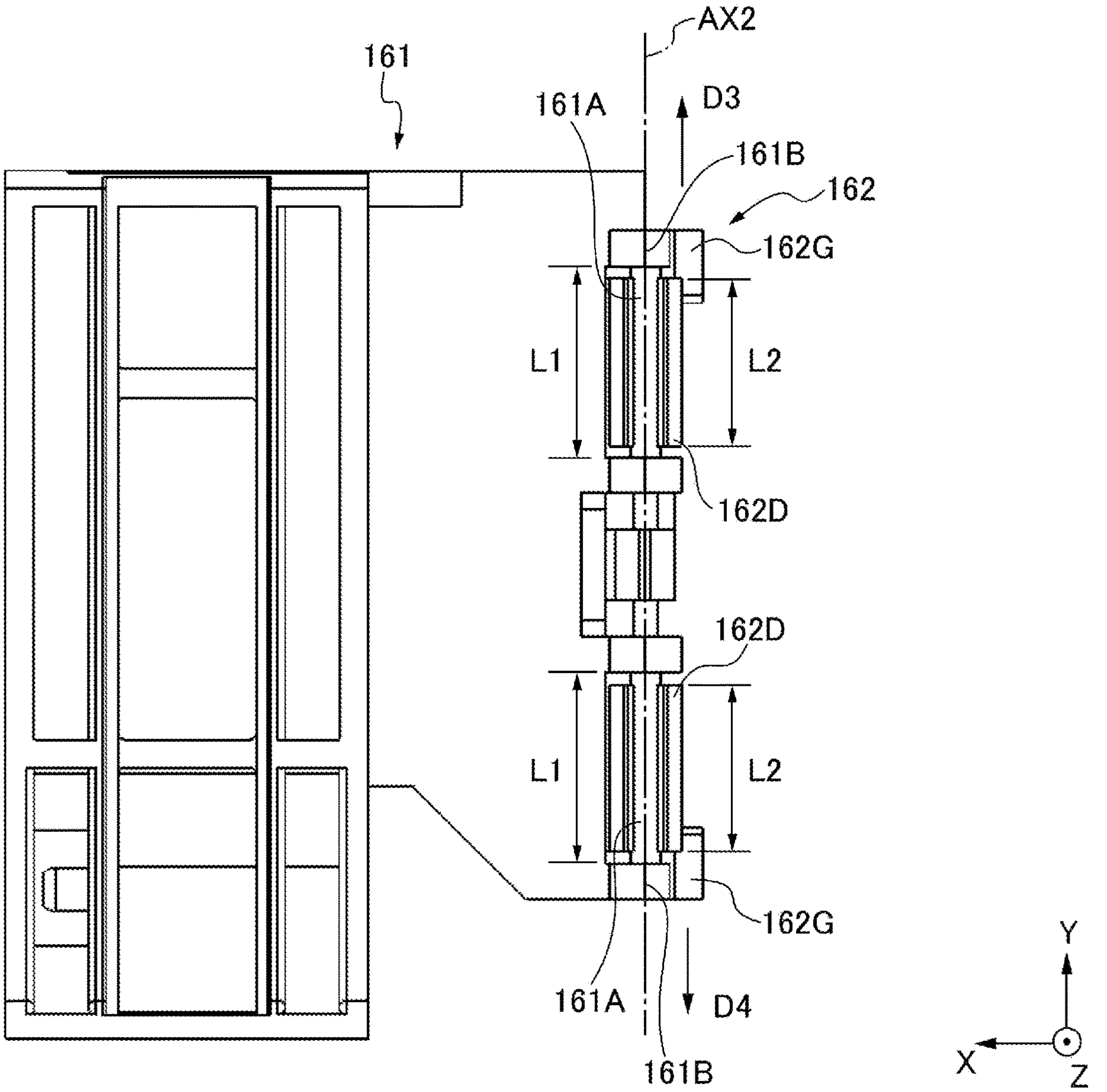
FIG. 12 is a plan view illustrating a state in which the first holder and the second holder are coupled to each other.
Figure 13:
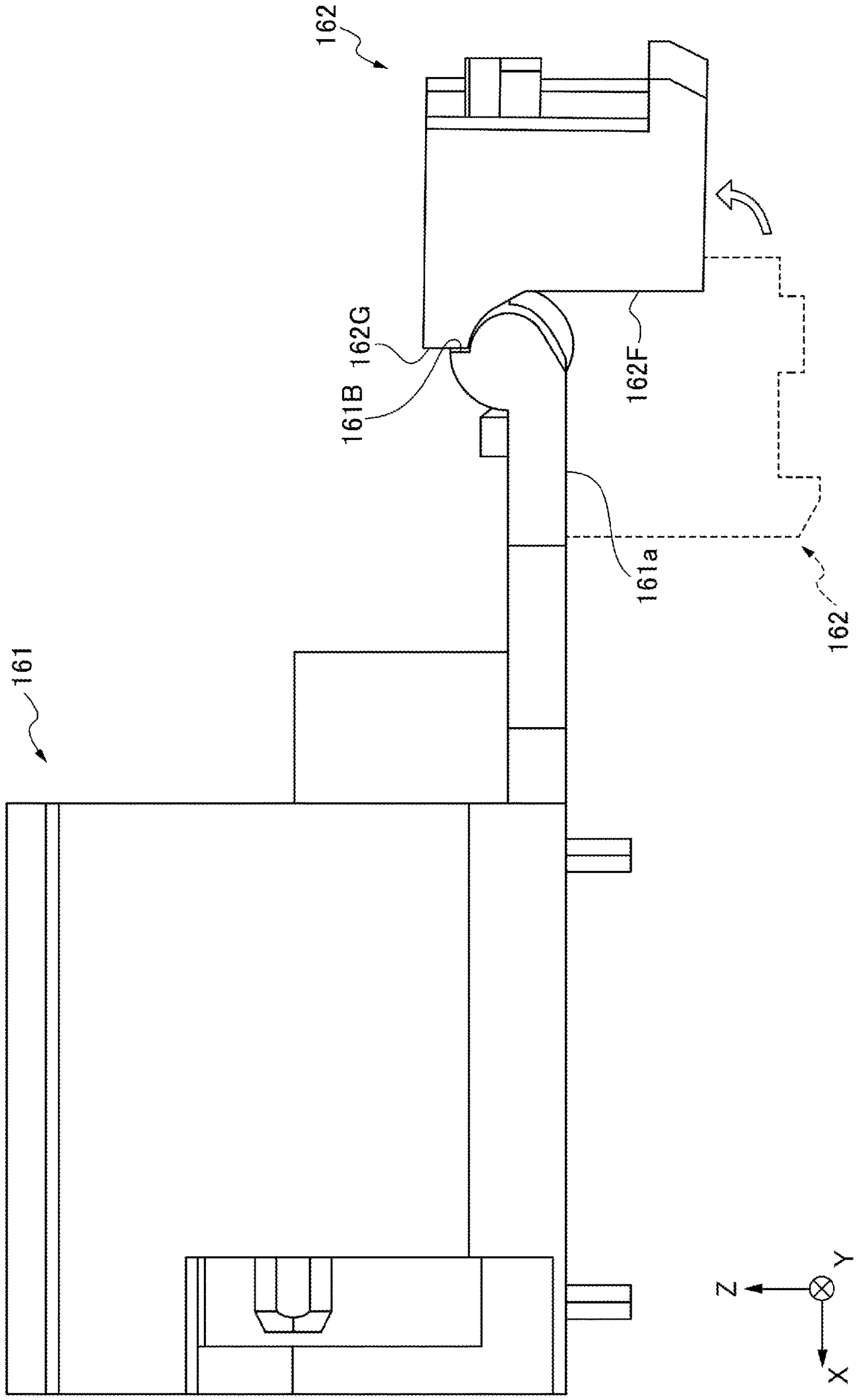
FIG. 13 is a diagram illustrating a configuration in which the rotation angle of the second holder is restricted.

Next, a coupling configuration of the first holder 161 and the second holder 162 will be described with reference to FIG. 10 through FIG. 13. FIG. 10 is a perspective view illustrating a state in which the first holder 161 and the second holder 162 are not coupled to each other. FIG. 11 is a perspective view illustrating a state in which the first holder 161 and the second holder 162 are coupled to each other. FIG. 12 is a plan view illustrating a state in which the first holder 161 and the second holder 162 are coupled to each other. FIG. 13 is a diagram illustrating a configuration in which the rotation angle of the second holder 162 is restricted.

As illustrated in FIG. 10, the shafts 161A are arranged at a certain interval at the front end portions of the first holder 161, and extend coaxially with the rotation center axis AX2 that is parallel to the Y axis direction. The holding arms 162D, having a cylindrical shape, are arranged at a certain interval at the upper end portions of a flat surface portion 162A of the second holder 162, and extend coaxially with the Y axis direction. Notch portions 162E are formed at the upper portions of the respective holding arms 162D. Each of the notch portions 162E has a certain width in the X axis direction and extends in the Y axis direction.

The shafts 161A of the first holder 161 and the holding arms 162D of the second holder 162 are coupled by what is known as a snap-fit structure. When the first holder 161 is attached to the second holder 162, the shafts 161A are pressed into the holding arms 162D while being pressed against the notch portions 162E of the holding arms 162D. In this manner, the notch portions 162E are pressed and expanded by elastic deformation, thus allowing the shafts 161A to be fitted into the holding arms 162D as illustrated in FIG. 11. Accordingly, the second holder 162 is held by the first holder 161 so as to be rotatable clockwise (in the D5 direction in FIG. 11) and counterclockwise (in the D6 direction in FIG. 11) about the rotation center axis AX2 when viewed from the −Y axis side.

As illustrated in FIG. 12, lengths L2 of the holding arms 162D in the Y axis direction are smaller than lengths L1 of the shafts 161A in the Y axis direction. That is, the first holder 161 has gaps (with a length=L1−L2) between the wall surfaces supporting the both ends of the shafts 161A, and the both ends of the holding arms 162D. Therefore, the holding arms 162D (that is, the second holder 162) are movable in the Y axis direction by the gaps.

Note that the second holder 162 is configured to hold the external connection terminal 165 via the third holder 163. Accordingly, when the second holder 162 is movable in the Y axis direction and is rotatable about the rotation center axis AX2 with respect to the first holder 161, the external connection terminal 165 is also movable in the Y axis direction and is rotatable about the rotation center axis AX2 with respect to the first holder 161.

As illustrated in FIG. 10 through FIG. 13, side wall portions 162B and 162C, provided on both sides in the Y axis direction the second holder 162, have contact surfaces 162F and contact surfaces 162G, which serve as upper surfaces.

As illustrated in FIG. 13, the contact surfaces 162F contact a bottom surface 161*a* (surface on the −Z axis side) of the first holder 161 in a state in which the second holder 162 is rotated clockwise to the maximum when viewed from the −Y axis side. Therefore, the contact surfaces 162F restrict the clockwise rotation angle of the second holder 162.

The contact surfaces 162G are provided on the front side (−X axis side) relative to the contact surfaces 162F. As illustrated in FIG. 13, the contact surfaces 162G contact a restricting surface 161B of the first holder 161 in a state in which the second holder 162 is rotated counterclockwise approximately 90 degrees when viewed from the −Y axis side. Accordingly, the contact surfaces 162G restrict the counterclockwise rotation angle of the second holder 162 to be approximately 90 degrees.

Further, hooks 162J, protruding downward (toward the −Z axis side), are provided at the bottom end portions on the rear side (+X axis side) of the side wall portions 162B and 162C. As illustrated in FIG. 5, hooks 124 projecting upward (toward the +Z axis) are provided at the bottom of the case body 120. Each of the hooks 162J is engaged with a corresponding hook 124 via a predetermined gap (not illustrated) in a state in which the terminal 160 is assembled into the case body 120. In this manner, the case body 120 holds the second holder 162 while restricting the movement of the second holder 162 in the front-rear direction (in the X axis direction) by a predetermined amount or more and the rotation of the second holder 162 by a predetermined amount or more when viewed from the Y-axis side.

Further, in the present embodiment, the rotatable angle of the second holder 162 is approximately 90 degrees; however, the rotatable angle is not limited thereto. For example, the rotatable angle of the second holder 162 may be 90 degrees or more by changing one or more of the positions of the restricting surface 161B, the contact surfaces 162F, and the contact surfaces 162G.

As described, in the terminal 160 according to the present embodiment, the shafts 161A are coupled to the holding arms 162D by what is known as a snap-fit structure, that is, by simply pressing and fitting the shafts 161A of the first holder 161 into the holding arms 162D of the second holder 162. In this manner, a configuration in which the external connection terminal 165 is movable in the Y axis direction and the external connection terminal 165 is rotatable about the rotation center axis AX2 can be achieved.

In the terminal 160 according to the present embodiment, the second holder 162 can be rotated 90 degrees with respect to the first holder 161. Therefore, as will be described later with reference to FIG. 21 through FIG. 23, in order to fix the FPC 132 and the relay FPC 164 to the bottom surface 161*a* (on the −Z side) of the first holder 161 with pins 161C in a state in which the FPC 132 and the relay FPC 164 overlap each other, the FPC 132 and the relay FPC 164 may be pressed and riveted by a riveting device from below (from the −Z axis side), or the FPC 132 and the relay FPC 164 may be pressed and heated by a heating device from below (from the −Z axis side) such that wiring of the FPC 132 and wiring of the relay FPC are connected by soldering. At this time, a work area of the bottom surface 161*a* can be increased by rotating the second holder 162 approximately 90 degrees. Accordingly, the riveting device and the heating device can be prevented from interfering with components (the second holder 162, the third holder 163, the relay FPC 164, and the external connection terminal 165) of the terminal 160.

(Coupling Configuration of Second Holder 162 and Third Holder 163)

Figure 14:
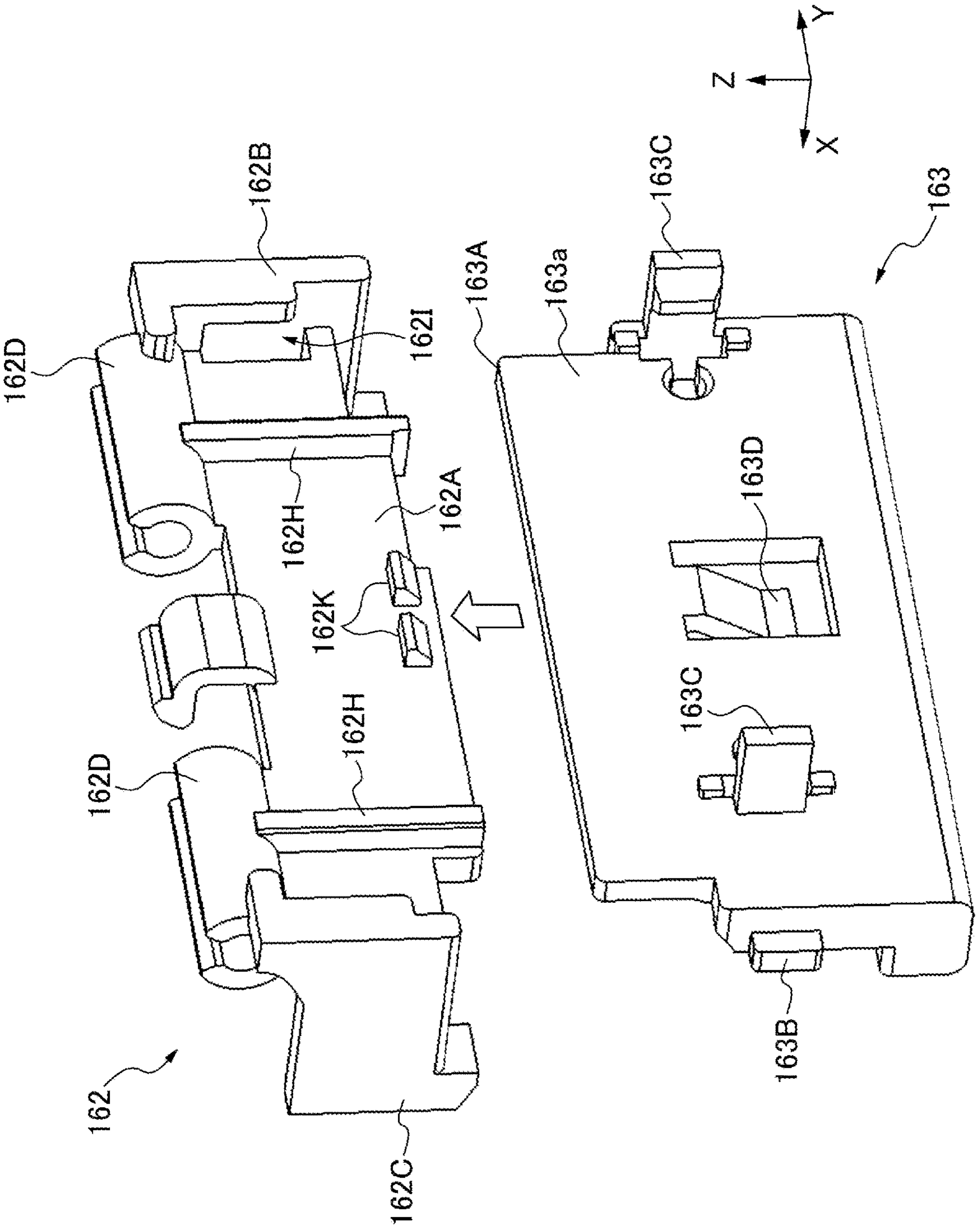
FIG. 14 is a perspective view illustrating a state in which the second holder and a third holder are not coupled to each other.
Figure 15:
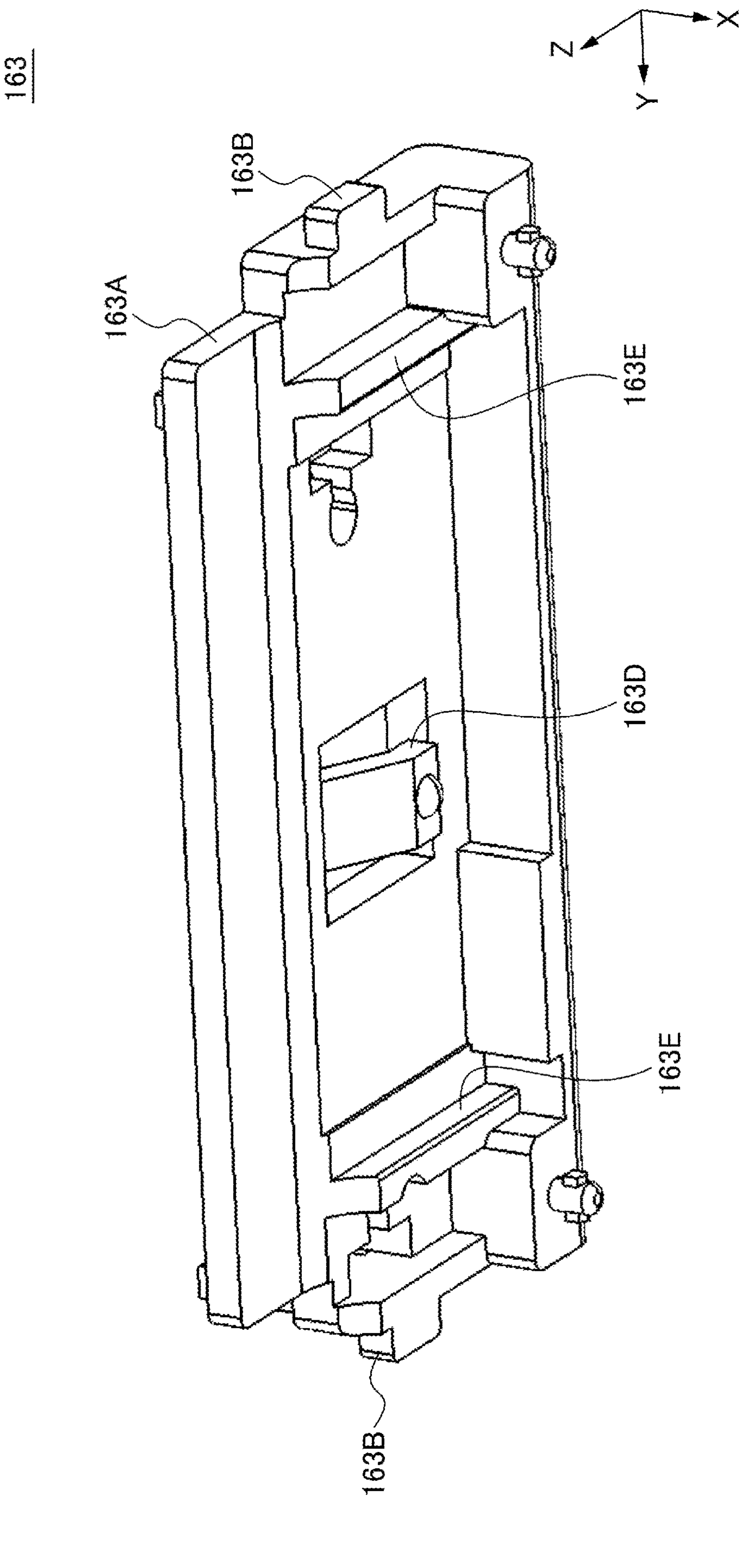
FIG. 15 is a perspective view illustrating a configuration on the +X side of the third holder.

Next, a coupling configuration of the second holder 162 and the third holder 163 will be described with reference to FIG. 14 through FIG. 18. FIG. 14 is a perspective view illustrating a state in which the second holder 162 and the third holder 163 are not coupled to each other. FIG. 15 is a perspective view illustrating a configuration on the +X side of the third holder 163.

As illustrated in FIG. 14 and FIG. 15, the third holder 163 has a flat plate portion 163A. The flat plate portion 163A has a flat plate shape and is substantially parallel to the YZ plane. The surface on the −X axis side of the flat plate portion 163A serves as the installation surface 163*a* on which the external connection terminal 165 is disposed. As illustrated in FIG. 14, the pair of engaging claws 163C projecting toward the −X axis side is provided on the installation surface 163*a*. Further, projections 163B projecting outward are provided on the respective side surfaces on the +Y axis side and the −Y axis side of the flat plate portion 163A. Further, a lever portion 163D is provided approximately at the center of the flat plate portion 163A and protrudes toward the side (+X axis side) opposite to the installation surface 163*a*. Further, a pair of guide ribs 163E, extending in the Z axis direction, is provided on the surface on the +X axis side of the flat plate portion 163A.

As illustrated in FIG. 14, the second holder 162 includes the flat surface portion 162A, the side wall portion 162B, and the side wall portion 162C. The flat surface portion 162A is a portion that is substantially parallel to the YZ plane. The side wall portion 162B is a wall portion that is provided on the +Y axis side of the flat surface portion 162A and is substantially parallel to the XZ plane. The side wall portion 162C is a wall portion that is provided on the −Y axis side of the flat surface portion 162A and is substantially parallel to the XZ plane.

The second holder 162 includes the pair of the holding arms 162D at the upper end of the flat surface portion 162A. Further, the second holder 162 includes a pair of guide ribs 162H extending in the Z axis direction and provided on the surface on the −X axis side of the flat surface portion 162A. Further, the second holder 162 includes a pair of guide grooves 1621 extending in the Z axis direction and formed at the end portions in the Y axis direction of the flat surface portion 162A. Further, the second holder 162 includes projections 162K. The projections 162K pre formed at the center in the Y axis direction of the flat surface portion 162A and in the vicinity of the bottom end in the Z axis direction of the flat surface portion 162A.

Figure 16A:
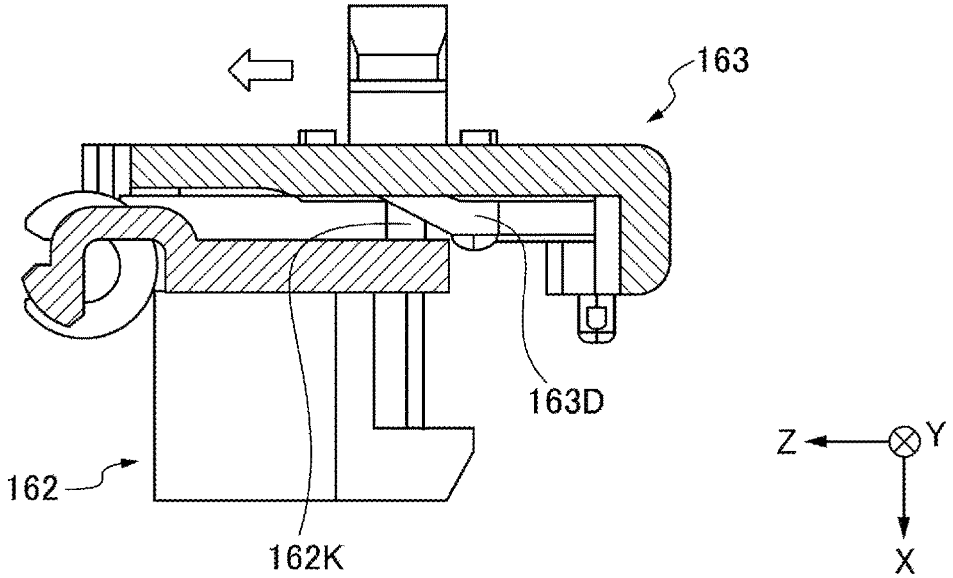
FIG. 16A is a cross-sectional view illustrating a process for attaching the third holder to the second holder.
Figure 16B:
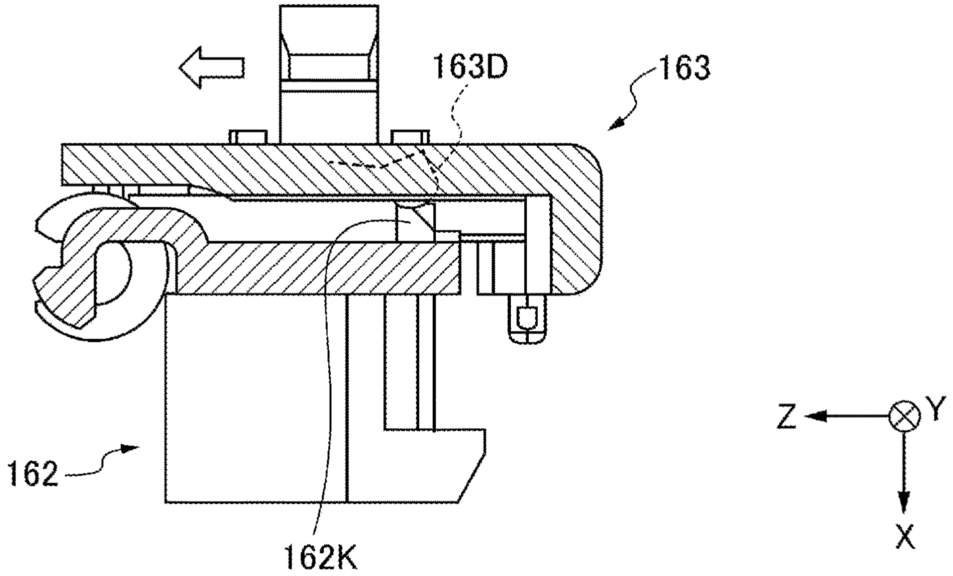
FIG. 16B is a cross-sectional view illustrating the process for attaching the third holder to the second holder.
Figure 16C:
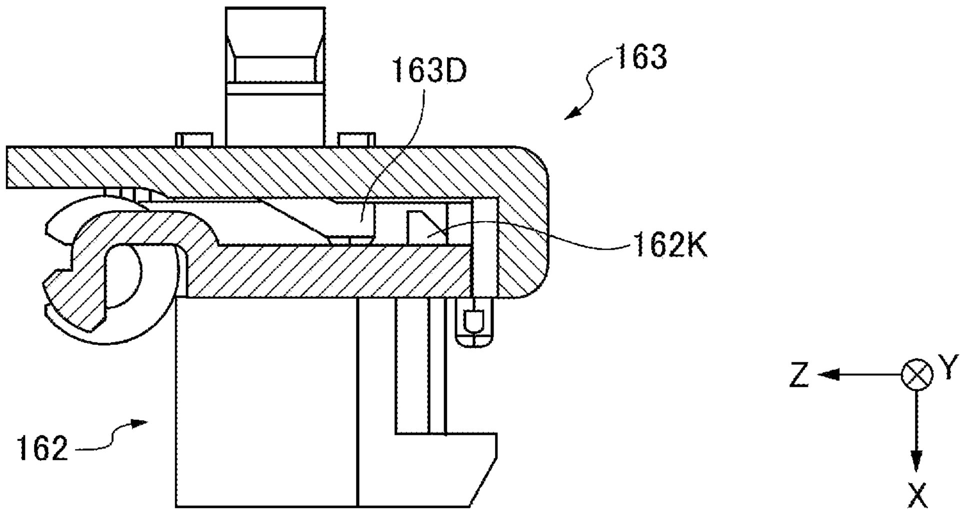
FIG. 16C is a cross-sectional view illustrating the process for attaching the third holder to the second holder.

FIG. 16A through FIG. 16C are cross-sectional views illustrating a process for attaching the third holder 163 to the second holder 162. The third holder 163 is attached to the second holder 162 by causing the third holder 163 to slide upward (in the +Z axis direction) from the bottom side of the second holder 162. At this time, the inner wall surfaces of the guide ribs 163E provided on the third holder 163 slide along the outer wall surfaces of the guide ribs 162H provided on the second holder 162. Further, the projections 163B of the third holder 163 are inserted and slide into the guide grooves 1621 of the second holder 162. Accordingly, the third holder 163 can be guided in the Y axis direction and the X axis direction and slide upward in the +Z axis direction while maintaining an appropriate position and orientation. That is, the pair of the guide ribs 163E and the pair of the guide ribs 162H are an example of a "guide mechanism". Further, the pair of guide grooves 1621 and the pair of projections 163B are another example of a "guide mechanism".

As illustrated in FIG. 16A, when the third holder 163 slides to a predetermined position relative to the second holder 162, an inclined surface of the upper side (+Z axis side) of the lever portion 163D of the third holder 163 contacts inclined surfaces on the lower side (−Z axis side) of the projections 162K of the second holder 162.

As illustrated in FIG. 16B, when the third holder 163 is pressed upward, the lever portion 163D elastically deforms and is moved over the projections 162K.

As illustrated in FIG. 16C, when the lever portion 163D is positioned on the upper side (+Z axis side) relative to the projections 162K, the lever portion 163D returns to the original shape, and the third holder 163 is fitted into the second holder 162. In this manner, the third holder 163 is attached to the second holder 162.

Figure 17:
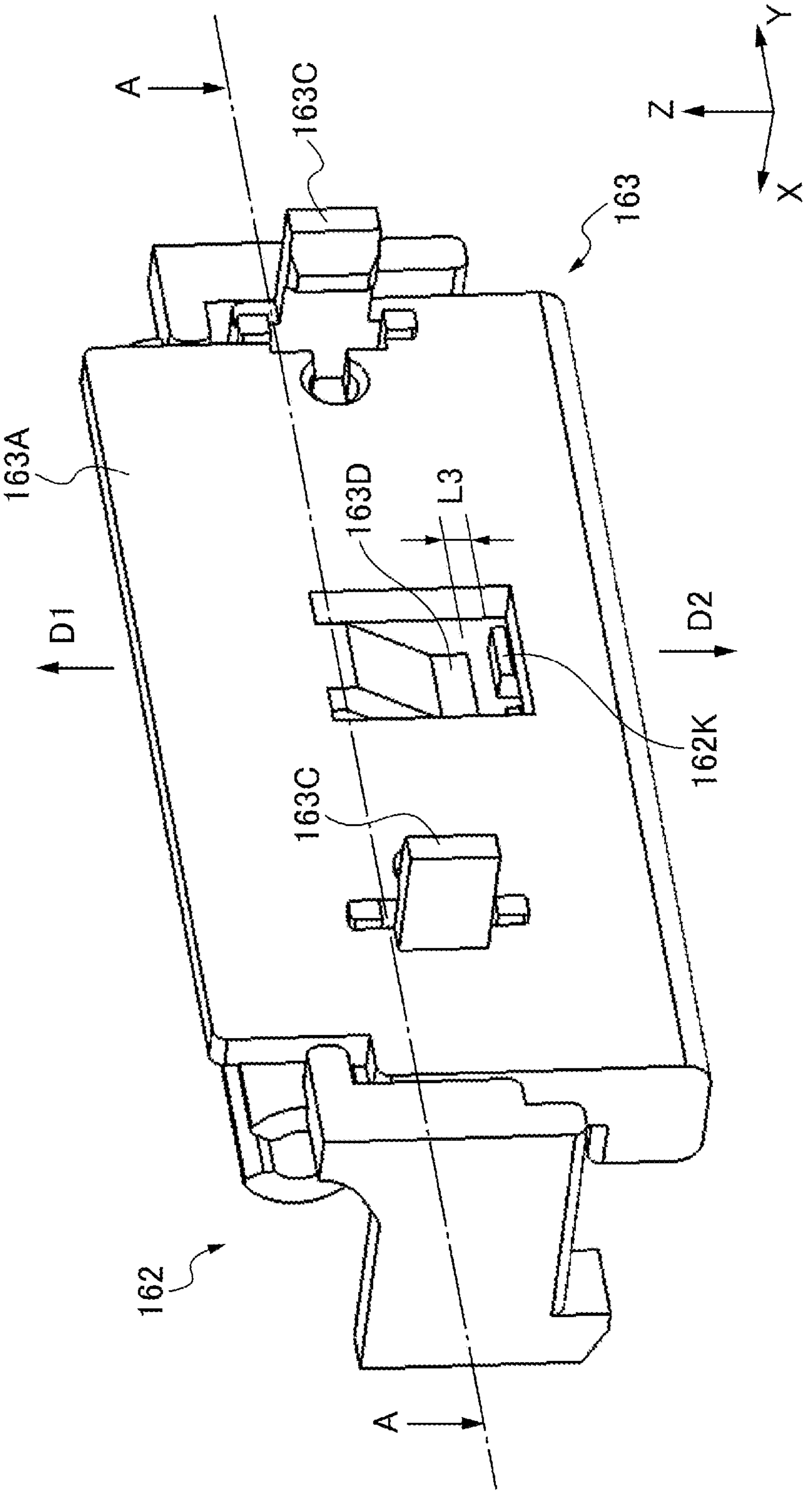
FIG. 17 is a perspective view illustrating a state in which the second holder and the third holder are coupled to each other.
Figure 18:
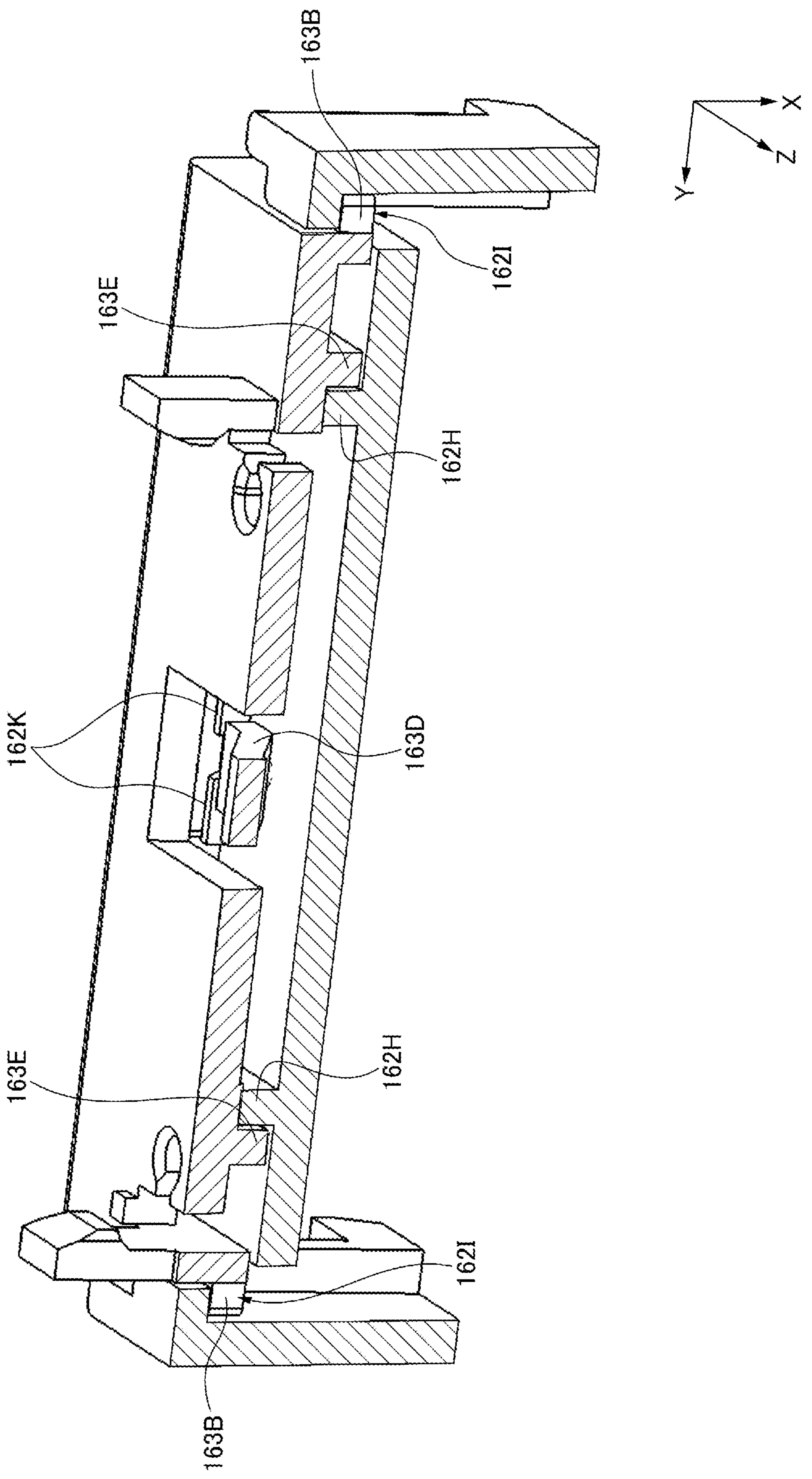
FIG. 18 is a cross-sectional view of the second holder and the third holder taken through AA of FIG. 17.

FIG. 17 is a perspective view illustrating a state in which the second holder 162 and the third holder 163 are coupled to each other. FIG. 18 is a cross-sectional view of the second holder 162 and the third holder 163 taken through AA of FIG. 17.

As illustrated in FIG. 17 and FIG. 18, in a state in which the second holder 162 and the third holder 163 are coupled, downward movement of the third holder 163 is restricted by the end surface (on the −Z axis side) of the lever portion 163D making contact with the upper surfaces (on the +Z axis side) of the projections 162K. Accordingly, the third holder 163 does not easily fall downward, out of the second holder 162.

As illustrated in FIG. 17, a gap L3 is provided between the end surface of the lever portion 163D and the upper surfaces of the projections 162K. Accordingly, the third holder 163 can be moved upward (in +Z axis direction, that is, the D1 direction in the drawing) and downward (in the −Z axis direction, that is, the D2 direction in the drawing) by the gap L3 with respect to the second holder 162 until reaching the lower limit position. The lower limit position is a position where the end surface of the lever part 163D contacts the upper surfaces of the projections 162K.

The movement of the third holder 163 in the upper-lower direction is also guided by the guide mechanism of the second holder 162 and the third holder 163 in a manner similar to the above-described process for attaching the third holder 163.

Note that the third holder 163 is configured to hold the external connection terminal 165. Accordingly, when the third holder 163 is held by the second holder 162 so as to be movable in the Z axis direction, the external connection terminal 165 is also movable in the Z axis direction with respect to the second holder 162.

A worker performing the assembly can attach the external connection terminal 165 and the relay FPC 164 to the third holder 163 with the third holder 163 being removed from the second holder 162. In this manner, the worker performing the assembly can readily attach the external connection terminal 165 and the relay FPC 164 to the third holder 163. Then the worker performing the assembly can attach the third holder 163, the external connection terminal 165, and the relay FPC 164 to the second holder 162 together.

Figure 19:
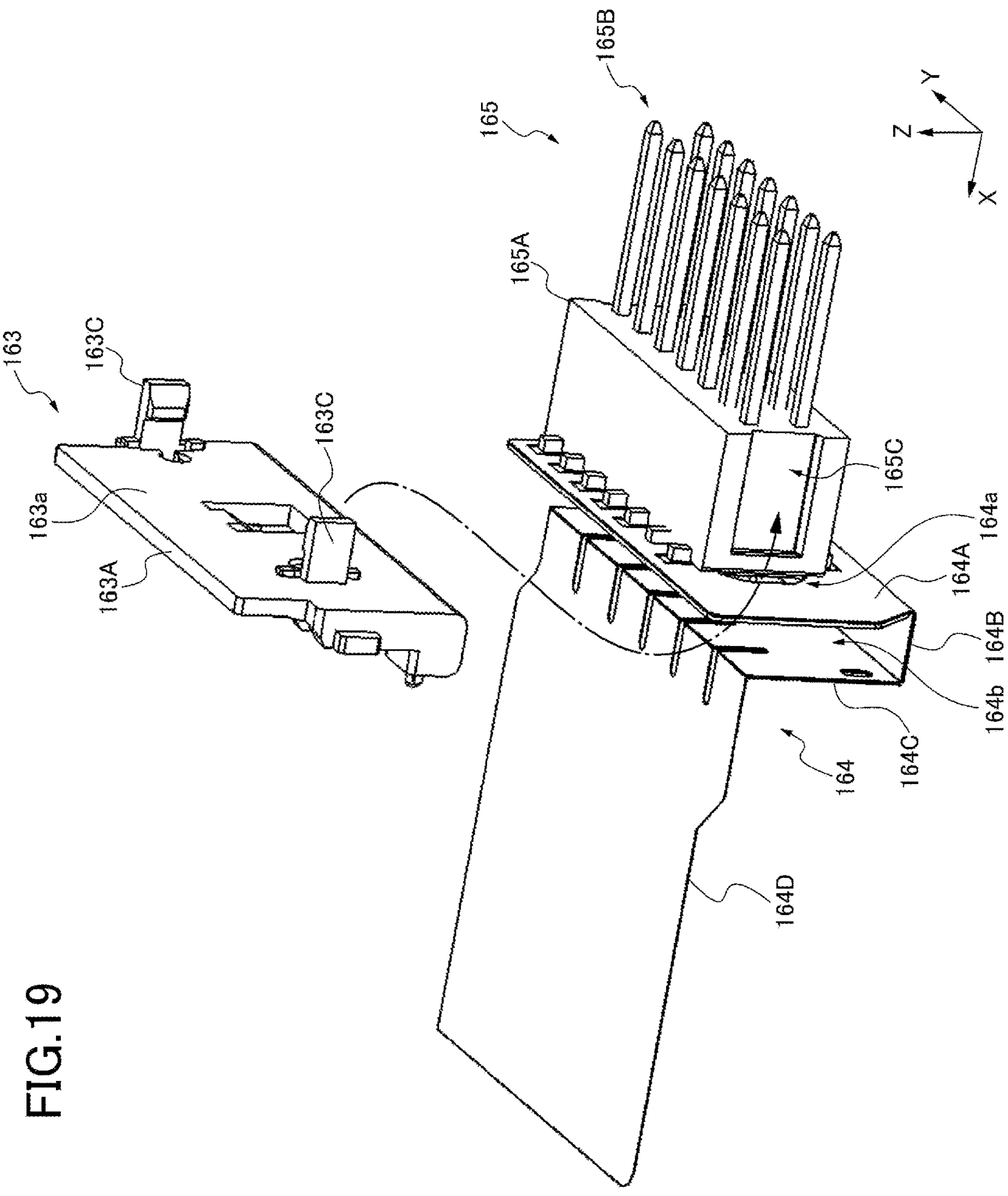
FIG. 19 is a perspective view illustrating a state in which the third holder, the external connection terminal, and the relay FPC are not coupled to one another.
Figure 20:
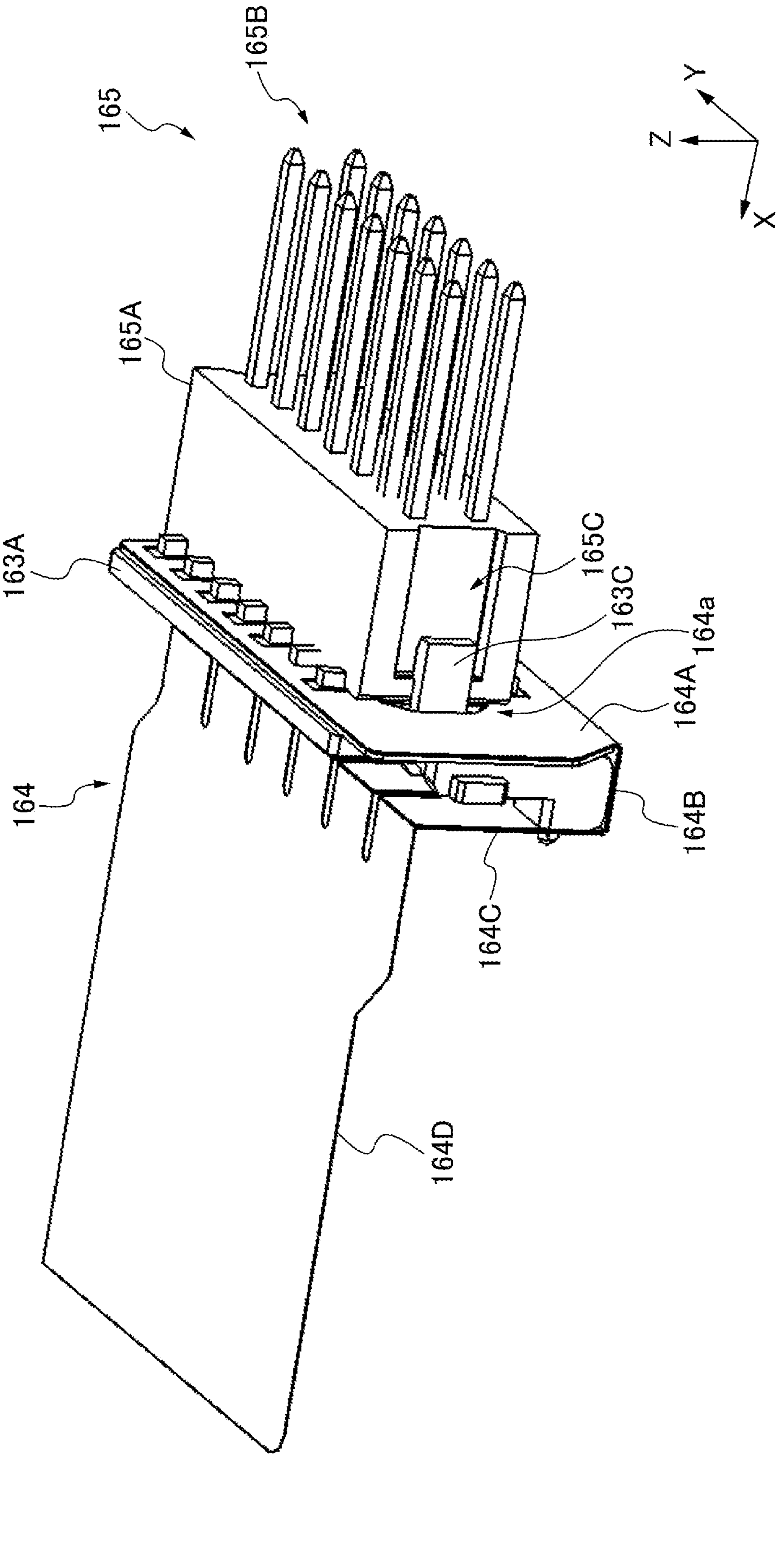
FIG. 20 is a perspective view illustrating a state in which the third holder, the external connection terminal, and the relay FPC are coupled to one another.

Next, a configuration in which the external connection terminal 165 and the relay FPC 164 are attached to the third holder 163 will be described with reference to FIG. 19 and FIG. 20. FIG. 19 is a perspective view illustrating a state in which the third holder 163, the external connection terminal 165, and the relay FPC 164 are not coupled to one another. FIG. 20 is a perspective view illustrating a state in which the third holder 163, the external connection terminal 165, and the relay FPC 164 are coupled to one another.

As illustrated in FIG. 19, the relay FPC 164 includes the first flat surface portion 164A, the second flat surface portion 164B, the third flat surface portion 164C, and the fourth flat surface portion 164D in order from the external connection terminal 165 side.

The first flat surface portion 164A is a flat portion parallel to the YZ plane. The external connection terminal 165 is fixedly connected to the first flat surface portion 164A by reflow soldering. The second flat surface portion 164B is a flat portion parallel to the XY plane and extending rearward from the lower end of the first flat surface portion 164A. The third flat surface portion 164C is a flat portion parallel to the YZ plane and extending upward from the rear end of the second flat surface portion 164B. The fourth flat surface portion 164D is a flat portion parallel to the XY plane and extending rearward from the upper end of the third flat surface portion 164C.

As illustrated in FIG. 19, when the external connection terminal 165 integrated with the relay FPC 164 is attached to the third holder 163, the third holder 163 is disposed in an installation region 164*b* surrounded by the first flat surface portion 164A, the second flat surface portion 164B, and the third flat surface portion 164C of the relay FPC 164, while causing the pair of engaging claws 163C of the third holder 163 to pass through a pair of openings 164*a* of the first flat surface portion 164A from the +X axis side to the −X axis side. At this time, because the relay FPC 164 is flexible, the installation region 164*b* can readily widen as necessary such that the third holder 163 can be disposed in the installation region 164*b*.

Accordingly, as illustrated in FIG. 20, the pair of engaging claws 163C is fitted into the engaging grooves 165C formed in the left and right side surfaces of the terminal block 165A. As a result, as illustrated in FIG. 20, the external connection terminal 165 is fixed onto the installation surface 163*a* of the third holder 163 and is held by the third holder 163, together with the first flat surface portion 164A of the relay FPC 164. That is, the external connection terminal 165 is integrated with the third holder 163 together with the relay FPC 164. Therefore, when the third holder 163 is attached to the second holder 162, the third holder 163, integrated with the external connection terminal 165 and the relay FPC 164, as illustrated in FIG. 20, can be attached to the second holder 162 together.

Figure 21:
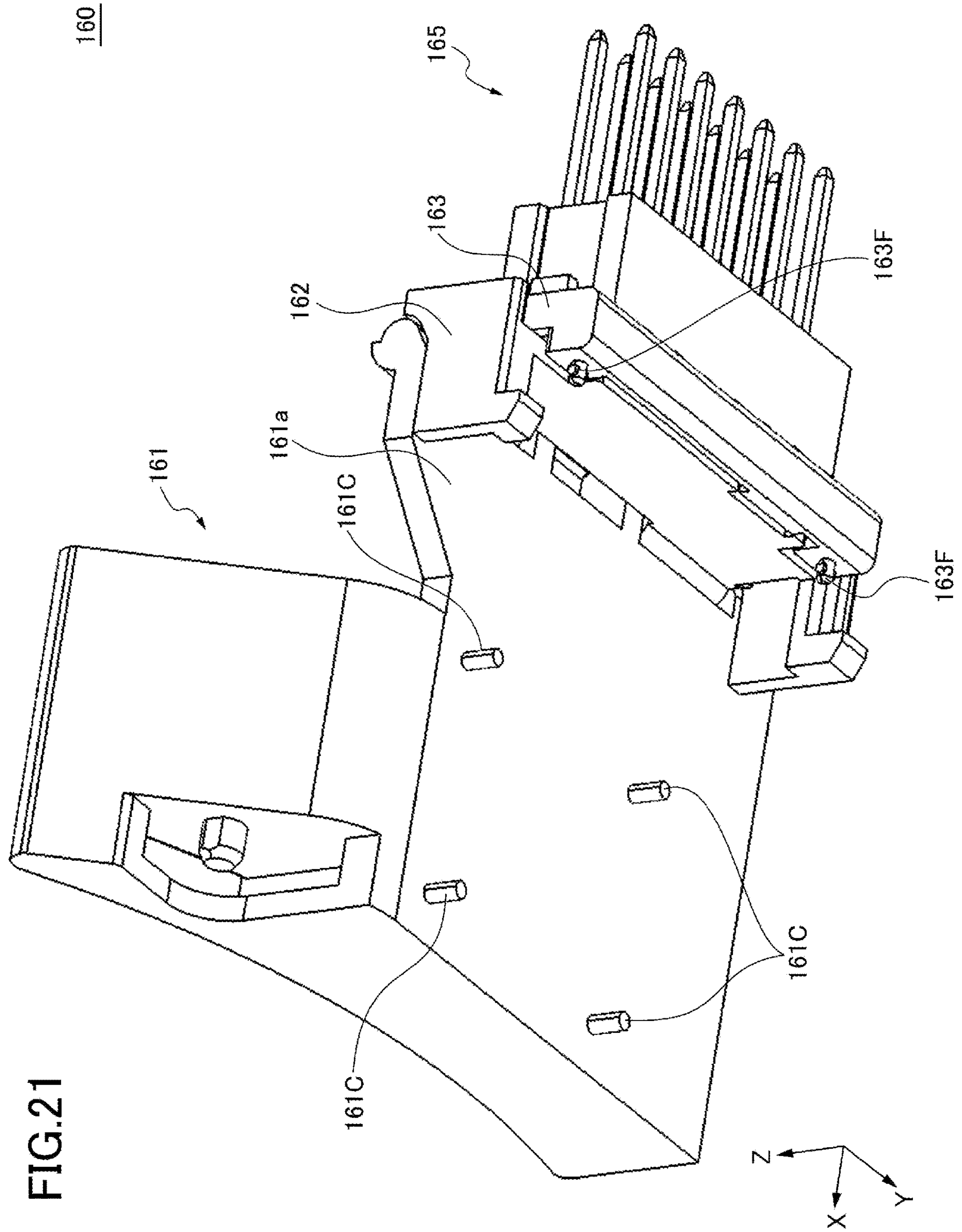
FIG. 21 is a perspective view of the exterior of the terminal in which the relay FPC is disposed.
Figure 22:
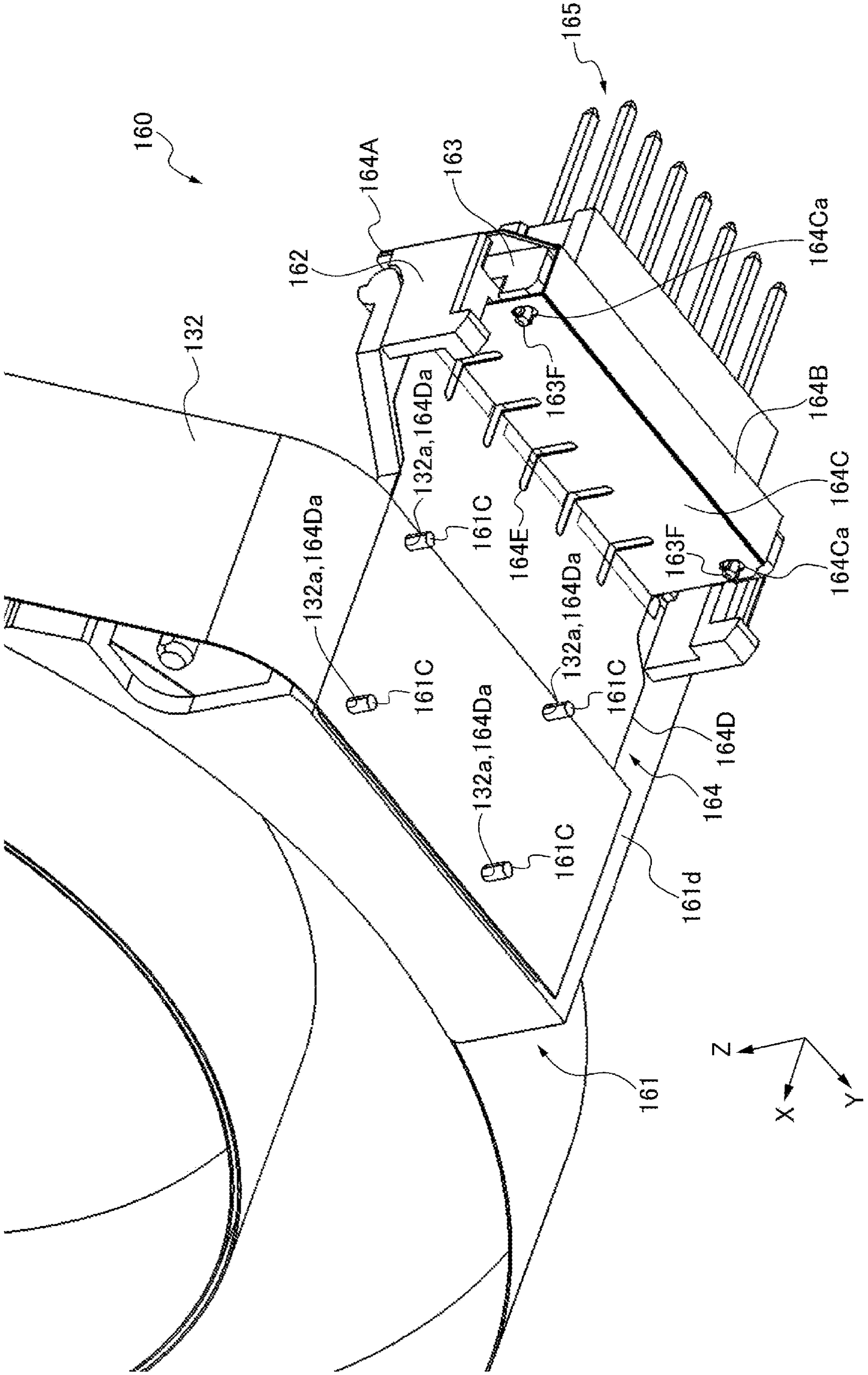
FIG. 22 is a perspective view of the exterior of the terminal in which the relay FPC is disposed.
Figure 23:
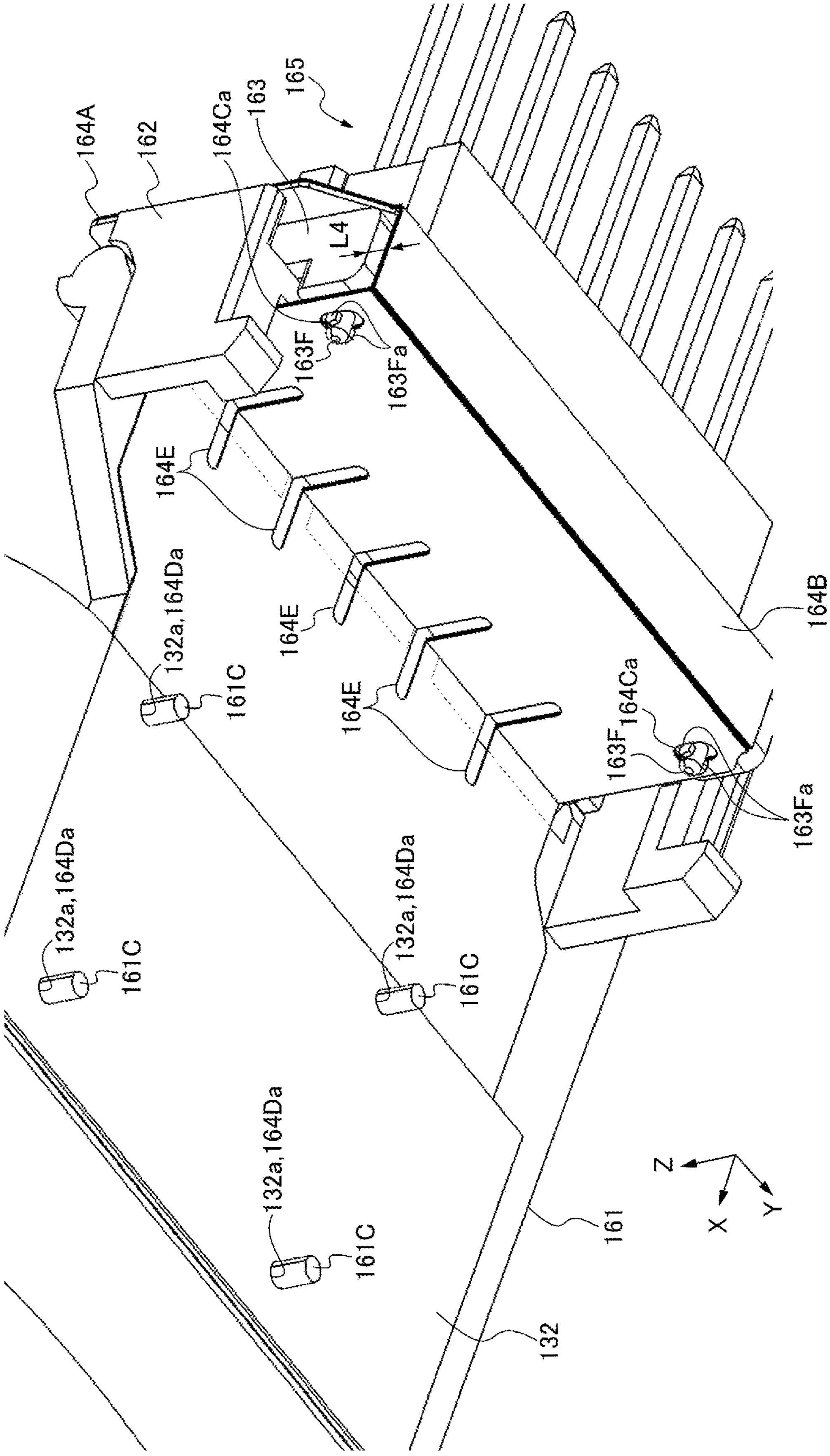
FIG. 23 is a partially enlarged view of the terminal of FIG. 22.

Next, the relay FPC 164 disposed in the terminal 160 will be described with reference to FIG. 21 through FIG. 23. FIG. 21 and FIG. 22 are perspective views of the exterior of the terminal 160 in which the relay FPC 164 is disposed. FIG. 23 is a partially enlarged view of the terminal 160 of FIG. 22. FIG. 21 does not illustrate the relay FPC 164 such that the surface of the terminal holder 166 (the surfaces of the first holder 161, the second holder 162, and the third holder 163) on which the relay FPC 164 is disposed can be depicted.

As illustrated in FIG. 21, the pins 161C each having a cylindrical shape are provided on the bottom surface 161*a* (on the −Z axis side) of the first holder 161 so as to protrude downward (in the −Z axis direction). The pins 161C illustrated in the drawings are in the initial state (before riveting work is performed). Thus, each of the pins 161C has a cylindrical shape with the same diameter from the bottom to the tip. After the FPC 132 and the relay FPC 164 are assembled (after the riveting work is performed), the tips of the pins 161C are crushed, and each of the pins 161C has a detachment preventing portion (not illustrated) whose tip is larger in diameter than the bottom. Further, a pair of pins 163F having a cylindrical shape is provided on the lower end of the rear surface (on the +X axis side) of the third holder 163 so as to protrude rearward (toward the +X axis side).

As illustrated in FIG. 22, the relay FPC 164 is disposed to conform to the surface of the terminal holder 166 (the surfaces of the first holder 161, the second holder 162, and the third holder 163).

Specifically, the first flat surface portion 164A of the relay FPC 164 is disposed on the installation surface 163*a* on the front side (−X axis side) of the third holder 163.

The second flat surface portion 164B of the relay FPC 164 is disposed while being slightly spaced apart from the bottom surface (on the −Z axis side) of the third holder 163.

The third flat surface portion 164C of the relay FPC 164 is disposed on the rear surface (on the +X axis side) of the third holder 163 and the rear surface (on the +X axis side) of the second holder 162.

The fourth flat surface portion 164D of the relay FPC 164 is disposed on the bottom surface 161*a* of the first holder 161.

As illustrated in FIG. 22 and FIG. 23, the fourth flat surface portion 164D of the relay FPC 164 and the end portion of the FPC 132 are disposed on the bottom surface 161*a* of the first holder 161 so as to overlap and cross each other. Then, the pins 161C provided on the bottom surface 161*a* (on the −Z axis side) of the first holder 161 are fitted into a plurality of circular-shaped openings 164Da formed in the fourth flat surface portion 164D of the relay FPC 164 and into a plurality of circular-shaped openings 132*a* formed in the end portion of the FPC 132.

Accordingly, the fourth flat surface portion 164D of the relay FPC 164 and the end portion of the FPC 132 can be accurately positioned with respect to the bottom surface 161*a* of the first holder 161 while the fourth flat surface portion 164D and the end portion of the FPC 132 overlap each other. Further, the tip of each of the pins 161C is crushed by the riveting device from below such that the diameter of the tip becomes larger that of the bottom (not illustrated) thus allowing the fourth flat surface portion 164D of the relay FPC 164 and the end portion of the FPC 132 to be securely brought into contact with and fixed to the bottom surface 161*a* of the first holder 161. At this time, rotating the second holder 162 counterclockwise approximately 90 degrees as illustrated in FIG. 13 can prevent the riveting device from interfering with the second holder 162 and the other components (the third holder 163, the relay FPC 164, and the external connection terminal 165).

In the above state, a plurality of wiring terminals (not illustrated) provided on the fourth flat surface portion 164D of the relay FPC 164 in an exposed state contact a plurality of wiring terminals (not illustrated) provided on the end portion of the FPC 132 in an exposed state. The each of the terminals is solder-plated in advance. Therefore, pressing and heating areas around the terminals by the heating device from below allow the terminals of the relay FPC 164 to be connected to the terminals of the FPC 132 by soldering. At this time, rotating the second holder 162 counterclockwise approximately 90 degrees as illustrated in FIG. 13 can prevent the heating device from interfering with the second holder 162 and the other components (the third holder 163, the relay FPC 164, and the external connection terminal 165).

As illustrated in FIG. 22 and FIG. 23, the pair of pins 163F provided on the rear surface (on the +X axis side) of the third holder 163 is fitted into a pair of rectangular-shaped openings 164Ca formed in the third flat surface portion 164C of the relay FPC 164. Accordingly, the third flat surface portion 164C of the relay FPC 164 is positioned with respect to and held by the rear surface of the third holder 163.

A pair of projections 163Fa projecting in the Y-axis direction is provided on the outer peripheral surface of each of the pins 163F. Therefore, the maximum widths of the pins 163F in the Y axis direction are larger than the widths of the openings 164Ca in the Y-axis direction. Accordingly, when the third flat surface portion 164C is disposed, the pins 163F are pushed into the openings 164Ca while causing the openings 164Ca to widen. At this time, the projections 163Fa serve as stoppers, and the pins 163F can be fitted into the openings 164Ca. As a result, the third flat surface portion 164C can be positioned and held by the pins 163F.

Each of the openings 164Ca has a rectangular shape extending in the upper-lower direction (the Z axis direction). Therefore, the pins 163F of the third holder 163 are movable in the upper-lower direction (the Z axis direction) within the openings 164Ca while holding the third flat surface portion 164C. With this configuration, when the third holder 163 slides relative to the second holder 162 in the upper-lower direction (the Z axis direction), loads exerted by the pins 163F on the third flat surface portion 164C in the upper-lower direction (the Z axis direction) can be reduced.

As illustrated in FIG. 23, a gap L4 is provided between the bottom surface (on the −Z axis side) of the third holder 163 and the second flat surface portion 164B of the relay FPC 164. With this configuration, when the third holder 163 slides downward relative to the second holder 162 (in the −Z axis direction), downward loads exerted by the bottom surface of the third holder 163 on the second flat surface portion 164B (in the −Z axis direction) can be reduced.

As illustrated in FIG. 22 and FIG. 23, a plurality of slits 164E extending in the X axis direction and the Z axis direction are formed in a corner portion formed by the third flat surface portion 164C and the fourth flat surface portion 164D of the relay FPC 164. With this configuration, loads exerted on the third flat surface portion 164C and the fourth flat surface portion 164D in the left-right direction (the Y axis direction) when the second holder 162 slides relative to the first holder 161 in the left-right direction (the Y axis direction), can be eliminated by the plurality of slits 164E.

The assembly of the terminal 160 is completed by performing the above-described assembly processes. However, the above-described assembly processes may be performed in a different order from that described above.

As described above, the rotary connector 10 according to an embodiment includes the case body 120, the rotor 110, the FPC 132, the external connection terminal 165, and the terminal holder 166. The case body 120 includes the outer cylindrical part 120A. The rotor 110 includes the inner cylindrical part 114, disposed within the housing space 120B of the case body 120, and is rotatably held by the case body 120. The FPC 132 is housed in a wound state between the outer cylindrical part 120A and the inner cylindrical part 114 within the housing space 120B. The external connection terminal 165 is provided on the end portion of the FPC 132. The terminal holder 166 holds the external connection terminal 165, such that the external connection terminal 165 is movable in the Y axis direction (the first axis direction) and in the Z axis direction (the second axis direction) and is rotatable about the rotation center axis AX2 that is parallel to the Y axis direction. The Y axis direction (the first axis direction) intersects the Z axis direction (the second axis direction), and the rotation center axis AX2 is parallel to the Y axis direction.

Accordingly, in the rotary connector 10 according to the embodiment, the external connection terminal 165 is movable in the Y axis direction and in the Z axis direction. Therefore, the external connection terminal 165 can be readily positioned with respect to a connection partner (in the embodiment, the opening 152A provided at the reference position of the recess 152 of the housing 150).

In the rotary connector 10 according to the embodiment, the external connection terminal 165 includes the group of metal terminals 165B, and the terminal block 165A that holds the group of metal terminals 165B in an aligned state.

Accordingly, in the rotary connector 10 according to the embodiment, the group of metal terminals 165B can be readily and collectively positioned with respect to a connection partner (in the embodiment, the opening 152A of the housing 150).

In the rotary connector 10 according to the embodiment, the terminal holder 166 includes the first holder 161, the second holder 162, and the third holder 163. The second holder 162 is held so as to be movable in the Y axis direction and rotatable about the rotation center axis AX2, which is parallel to the Y axis direction, with respect to the first holder 161. The third holder 163 is held so as to be movable in the Z axis direction with respect to the second holder 162 and holds the external connection terminal 165.

Accordingly, in the rotary connector 10 according to the embodiment, a configuration in which the external connection terminal 165 is movable in the Y axis direction and in the Z axis direction and is rotatable about the rotation center axis AX2, which is parallel to the Y axis direction, can be relatively readily achieved by combining the three parts (the first holder 161, the second holder 162, a and the third holder 163).

In the rotary connector 10 according to the embodiment, the first holder 161 includes the shafts 161A that extend in the direction of the rotation center axis AX2, and the second holder 162 includes the holding arms 162D that are rotatably coupled to the shafts 161A by a snap-fit structure.

Accordingly, in the rotary connector 10 according to the embodiment, the second holder 162 can be readily and securely attached to the first holder 161. In addition, a configuration in which the external connection terminal 165 is rotatable can be relatively readily achieved.

In the rotary connector 10 according to the embodiment, the holding arms 162D of the second holder 162 are slidable relative to the shafts 161A of the first holder 161 in the Y axis direction.

Accordingly, in the rotary connector 10 according to the embodiment, a configuration in which the external connection terminal 165 is movable in the Y axis direction can be relatively readily achieved.

In the rotary connector 10 according to the embodiment, the second holder 162 and the third holder 163 have a guide mechanism (the pair of guide ribs 163E and the pair of guide ribs 162H as well as the pair of guide grooves 1621 and the pair of projections 163B) configured to guide sliding of the third holder 163 relative to the second holder 162 in the Z axis direction. The third holder 163 slides along the guide mechanism in the Z axis direction so as to be attachable to the second holder 162.

Accordingly, in the rotary connector 10 according to the embodiment, the third holder 163 can be readily and securely attached to the second holder 162.

The rotary connector 10 according to the embodiment further incudes the relay FPC 164 that relays the external connection terminal 165 to the FPC 132. The first holder 161 includes the plurality of pins 161C that position and hold an overlapping portion between the end portion of the FPC 132 and an end portion of the relay FPC 164.

Accordingly, in the rotary connector 10 according to the embodiment, the end portion of the FPC 132 and the end portion of the relay FPC 164 can be readily and securely positioned and fixed. In addition, the end portion of the FPC 132 can be readily and securely connected to the end portion of the relay FPC 164.

In the rotary connector 10 according to the embodiment, the relay FPC 164 includes the slits 164E that extend in directions intersecting the Y axis.

Accordingly, in the rotary connector 10 according to the embodiment, loads exerted on the relay FPC 164 when the terminal 165 is moved in the Y axis direction can be eliminated by the slits 164E.

Although the embodiment of the present invention has been specifically described above, the present invention is not limited to the specific embodiment, and various modifications and variations may be made without departing from the scope of the present invention.

For example, in the above-described embodiment, the external connection terminal 165 provided on the end portion on the vehicle body 14 side of the FPC 132 is movable and rotatable. However, the present invention is not limited thereto. Instead, an external connection terminal provided on an end portion on the steering wheel 12 side of the FPC 132 may be movable and rotatable.

What is claimed is:

1. A rotary connector comprising:

a case including an outer cylindrical part;

a rotor including an inner cylindrical part and rotatably held by the case, the inner cylindrical part being disposed within a housing space of the case;

a flexible cable housed in a wound state between the inner cylindrical part and the outer cylindrical part within the housing space;

an external connection terminal provided on an end portion of the flexible cable; and a terminal holder that holds the external connection terminal, such that the external connection terminal is movable in a first direction and in a second direction and is rotatable about a rotation center axis that is parallel to the first direction, the first direction intersecting the second direction, wherein the terminal holder includes a first holding member, a second holding member that is held by the first holding member so as to be movable in the first direction and rotatable about the rotation center axis with respect to the first holding member, the rotation center being parallel to the first direction, and a third holding member that is held by the second holding member so as to be linearly movable in the second direction with respect to the second holding member, and holds the external connection terminal.

2. The rotary connector according to claim 1, wherein the external connection terminal includes a plurality of metal terminals, and a terminal block that holds the plurality of metal terminals in an aligned state.

3. The rotary connector according to claim 1, wherein the first holding member includes a shaft that extends in a direction of the rotation center axis, and the second holding member includes a holding arm that is rotatably coupled to the shaft by a snap-fit structure.

4. The rotary connector according to claim 3, wherein the holding arm of the second holding member is slidable relative to the shaft of the first holding member in the first direction.

5. The rotary connector according to claim 1, wherein the second holding member and the third holding member have a guide mechanism configured to guide sliding of the third holding member relative to the second holding member in the second direction, and the third holding member slides along the guide mechanism in the second direction so as to be attachable to the second holding member.

6. The rotary connector according to claim 1, further comprising a relay flexible cable that relays the external connection terminal to the flexible cable, wherein the first holding member includes a plurality of pins that position and hold an overlapping portion between the end portion of the flexible cable and an end portion of the relay flexible cable.

7. The rotary connector according to claim 6, wherein the relay flexible cable includes a slit that extends in a direction intersecting the first direction.

8. The rotary connector according to claim 1, wherein the first direction is orthogonal to the second direction.

9. The rotary connector according to claim 1, wherein at least one of the second holding member or the third holding member includes a guide member configured to guide the third holding member, and wherein the third holding member is movable along the guide member.

10. The rotary connector according to claim 9, wherein the guide member includes at least one of a guide rib, a notch portion, a guide groove or a projection.

* * * * *